US012621492B2

(12) United States Patent
Chen et al.

(10) Patent No.: US 12,621,492 B2
(45) Date of Patent: May 5, 2026

(54) METHOD AND APPARATUSES FOR USING FACE VIDEO GENERATIVE COMPRESSION SEI MESSAGE

(71) Applicant: Alibaba (China) Co., Ltd., Hangzhou (CN)

(72) Inventors: Bolin Chen, Beijing (CN); Jie Chen, Beijing (CN); Shurun Wang, Beijing (CN); Yan Ye, San Diego, CA (US); Shiqi Wang, Kowloon Tong (HK)

(73) Assignee: Alibaba (China) Co., Ltd., Hangzhou (CN)

( * ) Notice: Subject to any disclaimer, the term of this patent is extended or adjusted under 35 U.S.C. 154(b) by 75 days.

(21) Appl. No.: 18/392,557

(22) Filed: Dec. 21, 2023

(65) Prior Publication Data

US 2024/0223813 A1      Jul. 4, 2024

Related U.S. Application Data

(60) Provisional application No. 63/436,626, filed on Jan. 1, 2023.

(51) Int. Cl.
*H04N 19/70* (2014.01)
*H04N 19/124* (2014.01)
(Continued)

(52) U.S. Cl.
CPC ........... *H04N 19/70* (2014.11); *H04N 19/124* (2014.11); *H04N 19/136* (2014.11); *H04N 19/172* (2014.11)

(58) Field of Classification Search
CPC .... H04N 19/70; H04N 19/124; H04N 19/136; H04N 19/172
See application file for complete search history.

(56) References Cited

U.S. PATENT DOCUMENTS

2003/0232312 A1* 12/2003 Newsom ................ G09B 19/08
434/156
2015/0092148 A1* 4/2015 Takano ............. G02F 1/133345
349/123
(Continued)

FOREIGN PATENT DOCUMENTS

CN          106105220 A       11/2016

OTHER PUBLICATIONS

PCT International Search Report and Written Opinion mailed Mar. 27, 2024, issued in corresponding International Application No. PCT/CN2023/142256 (7 pgs.).

(Continued)

*Primary Examiner* — Fabio S Lima
(74) *Attorney, Agent, or Firm* — Finnegan, Henderson, Farabow, Garrett & Dunner, LLP

(57)          ABSTRACT

A method of decoding a bitstream to output one or more pictures for a video stream, includes: receiving a bitstream; and decoding, using coded information of the bitstream, one or more pictures. The decoding includes: determining, based on an identifying number, whether a face video generative compression scheme is used; in response to a determination that the face video generative compression scheme is used, decoding a supplemental enhancement information (SEI) message, the SEI message comprising facial information; and reconstructing a face picture based on the facial information and a base picture associated with the SEI message.

17 Claims, 20 Drawing Sheets

(51) Int. Cl.
   *H04N 19/136* (2014.01)
   *H04N 19/172* (2014.01)

(56) References Cited

U.S. PATENT DOCUMENTS

| | | | |
|---|---|---|---|
| 2019/0377409 A1 | 12/2019 | Lemley et al. | |
| 2022/0094980 A1* | 3/2022 | Joshi | H04N 19/167 |
| 2022/0156981 A1 | 5/2022 | Oquab et al. | |
| 2022/0217371 A1* | 7/2022 | Jiang | H04N 19/85 |

OTHER PUBLICATIONS

Blanz et al., "A morphable model for the synthesis of 3d faces," in Proceedings of the 26th annual conference on Computer graphics and interactive techniques, 1999, pp. 187-194.

Bross et al., "Overview of the Versatile Video Coding (VVC) Standard and Its Applications," IEEE Transactions on Circuits and Systems for Video Technology, vol. 31, No. 10, pp. 3736-3764, 2021.

Chen et al., "Beyond key-point coding: Temporal evolution inference with compact feature representation for talking face video compression," in Proceedings of the IEEE Data Compression Conference, 10 pages, 2022.

Goodfellow et al., "Generative adversarial nets," Advances in neural information processing systems, vol. 27, 9 pages, 2014.

Lopez et al., "Head pose computation for very low bitrate video coding," in International Conference on Computer Analysis of Images and Patterns. Springer, 1995, pp. 440-447.

Siarohin et al., "First Order Motion Model for Image Animation," Advances in Neural Information Processing Systems, vol. 32, pp. 7137-7147, 2019.

Sullivan et al., "Overview of the High Efficiency Video Coding (HEVC) Standard," IEE Transactions on Circuits and Systems for Video Technology, vol. 22, No. 12, pp. 1649-1668 (2012).

Wang et al., "One-shot free-view neural talking-head synthesis for video conferencing," in Proceedings of the IEEE/CVFConference on Computer Vision and Pattern Recognition, 2021, pp. 10039-10049.

* cited by examiner

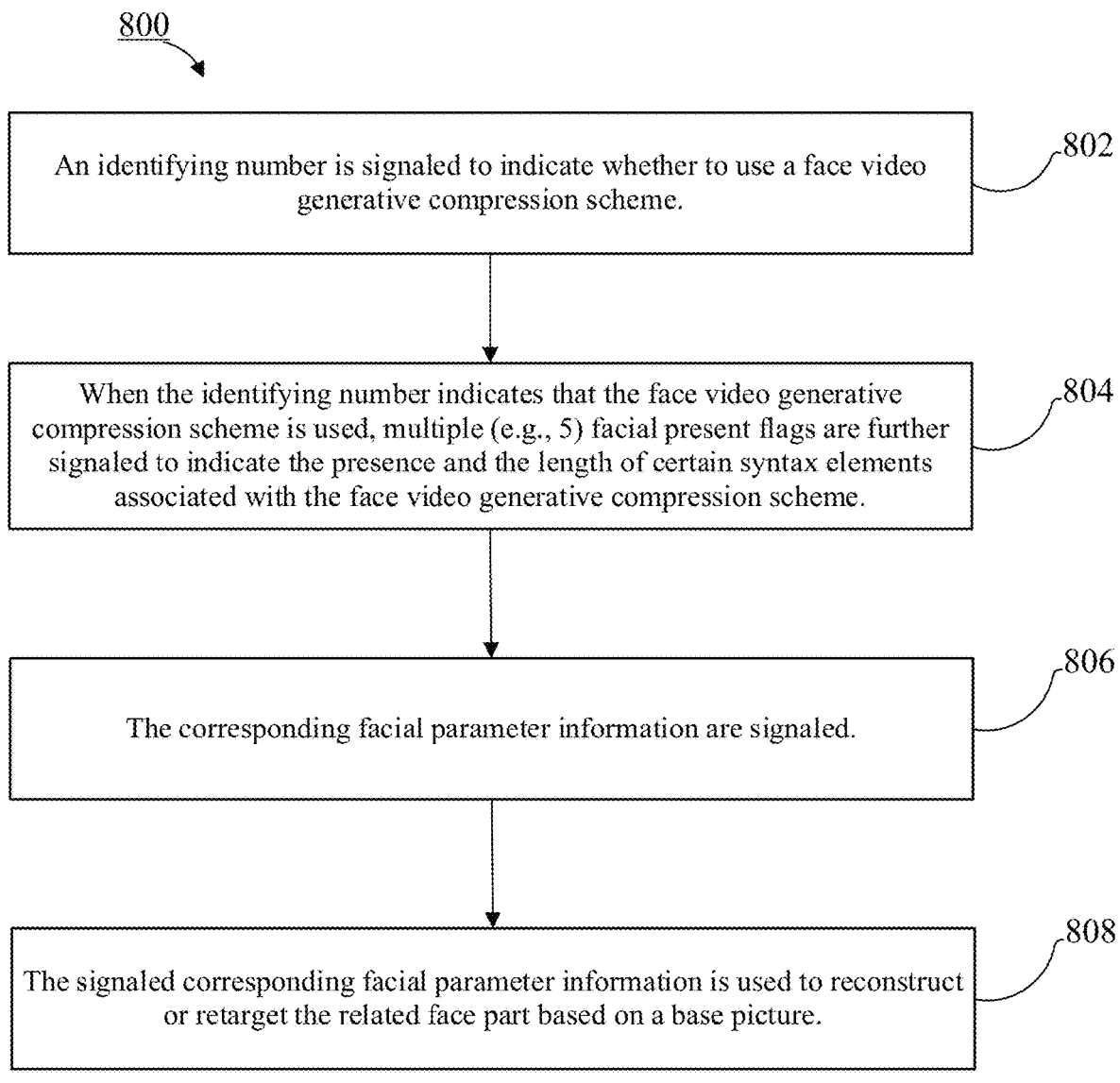

800

An identifying number is signaled to indicate whether to use a face video generative compression scheme. — 802

When the identifying number indicates that the face video generative compression scheme is used, multiple (e.g., 5) facial present flags are further signaled to indicate the presence and the length of certain syntax elements associated with the face video generative compression scheme. — 804

The corresponding facial parameter information are signaled. — 806

The signaled corresponding facial parameter information is used to reconstruct or retarget the related face part based on a base picture. — 808

FIG. 8

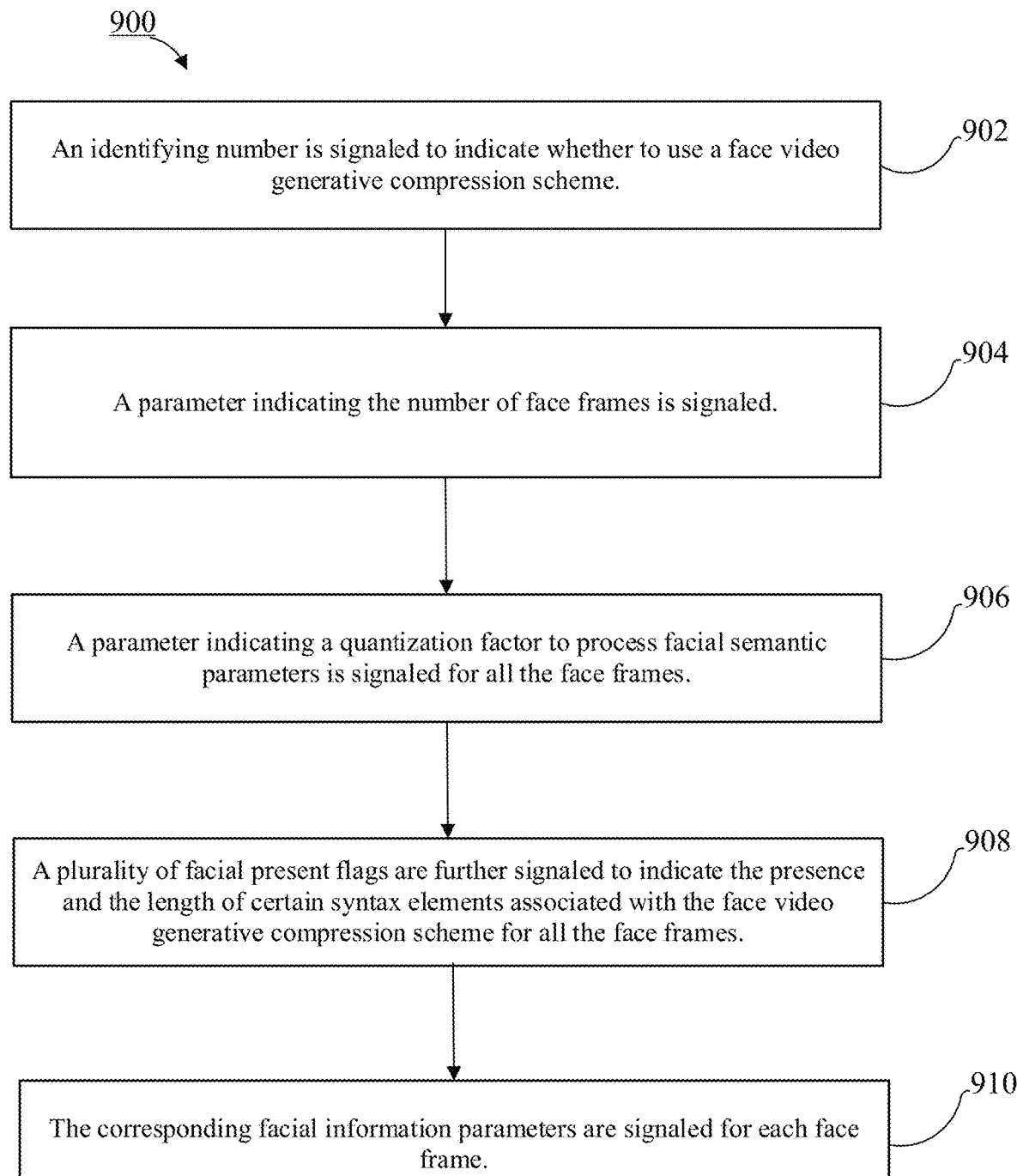

900

An identifying number is signaled to indicate whether to use a face video generative compression scheme. ⌒902

A parameter indicating the number of face frames is signaled. ⌒904

A parameter indicating a quantization factor to process facial semantic parameters is signaled for all the face frames. ⌒906

A plurality of facial present flags are further signaled to indicate the presence and the length of certain syntax elements associated with the face video generative compression scheme for all the face frames. ⌒908

The corresponding facial information parameters are signaled for each face frame. ⌒910

FIG. 9

Table 1: Exemplary syntax of the proposed face video generative compression SEI message

| Face_information( payloadSize ) { | Descriptor | |
|---|---|---|
| fi_id | ue(v) | 1001 |
| fi_num_set_of_parameter | ue(v) | 1002 |
| fi_quantization_factor | ue(v) | 1003 |
| fi_head_location_present_flag | u(1) | |
| fi_head_rotation_present_flag | u(1) | |
| fi_head_translation_ present_flag | u(1) | 1004 |
| fi_eye_blinking_present_flag | u(1) | |
| fi_mouth_motion_present_flag | u(1) | |
| for( i=0; i<fi_num_set_of_parameter;i++){ | | |
|   if(fi_head_location_present_flag==1){ | | |
|     fi_location[i] | ue(v) | |
|   } | | |
|   if(fi_head_rotation_present_flag==1){ | | |
|     fi_rotation_roll [i] | ue(v) | |
|     fi_rotation_pitch[i] | ue(v) | |
|     fi_rotation_ yaw[i] | ue(v) | |
|   } | | |
|   if(fi_head_translation_present_flag==1){ | | |
|     fi_translation_x[i] | ue(v) | |
|     fi_translation_y[i] | ue(v) | |
|     fi_translation_z[i] | ue(v) | |
|   } | | |
|   if(fi_eye_blinking_present_flag==1){ | | |
|     fi_eye[i] | ue(v) | |
|   } | | |

FIG. 10

| | |
|---|---|
| if(fi_mouth_motion_present_flag==1){ | |
| fi_mouth_para1[i] | ue(v) |
| fi_mouth_para2[i] | ue(v) |
| fi_mouth_para3[i] | ue(v) |
| fi_mouth_para4[i] | ue(v) |
| fi_mouth_para5[i] | ue(v) |
| fi_mouth_para6[i] | ue(v) |
| } | |
| } | |
| } | |

FIG. 10 (Continued)

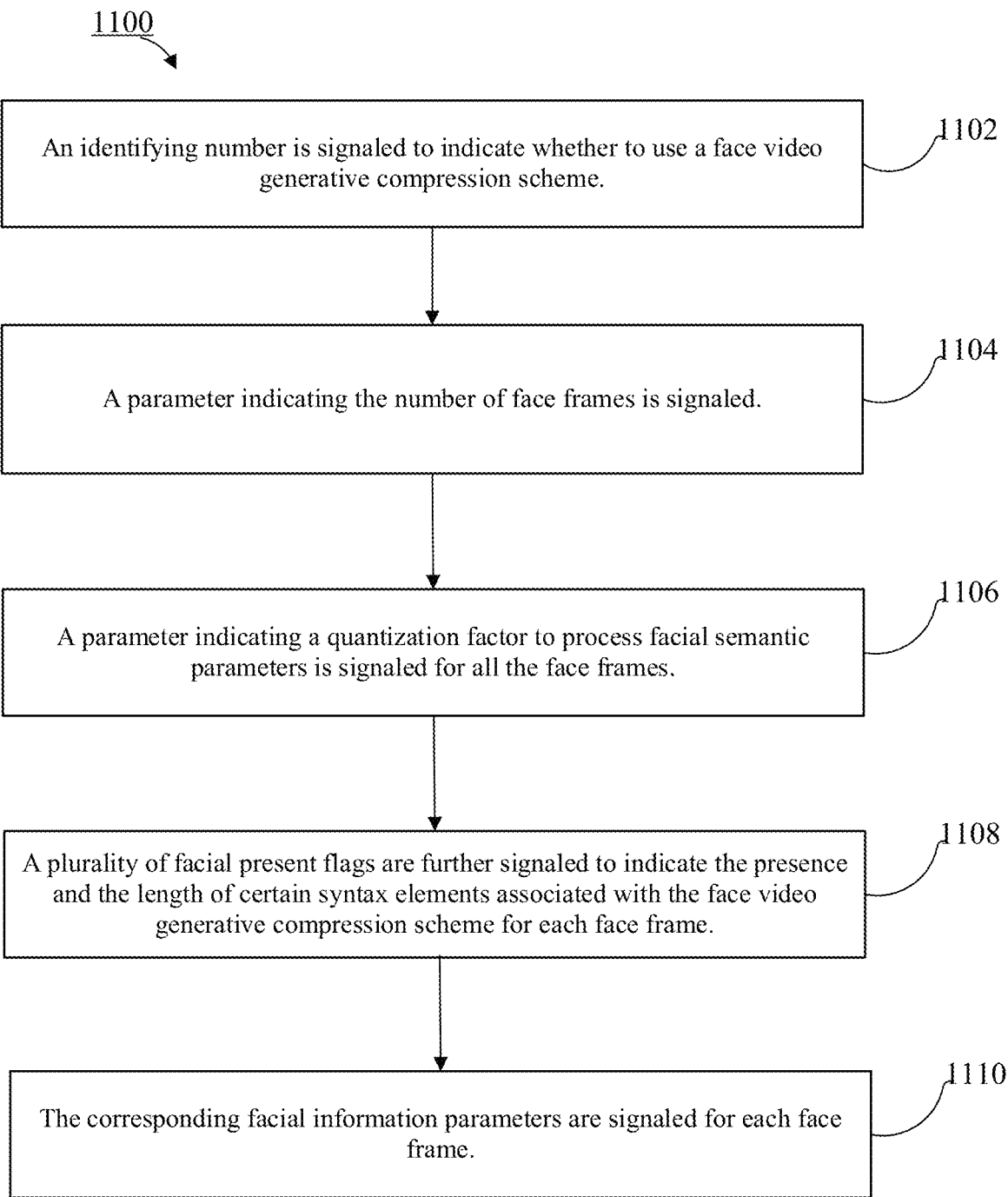

1100

An identifying number is signaled to indicate whether to use a face video generative compression scheme.                                                                 1102

A parameter indicating the number of face frames is signaled.                                                                 1104

A parameter indicating a quantization factor to process facial semantic parameters is signaled for all the face frames.                                                                 1106

A plurality of facial present flags are further signaled to indicate the presence and the length of certain syntax elements associated with the face video generative compression scheme for each face frame.                                                                 1108

The corresponding facial information parameters are signaled for each face frame.                                                                 1110

FIG. 11

Table 2: Exemplary syntax of the proposed face video generative compression SEI message

| Face_information( payloadSize ) { | Descriptor | |
|---|---|---|
| fi_id | ue(v) | 1201 |
| fi_num_set_of_parameter | u(9) | 1202 |
| fi_quantization_factor | u(6) | 1203 |
| for( i=0; i<fi_num_set_of_parameter;i++){ | | |
|    fi_head_location_present_flag[i] | u(1) | |
|    fi_head_rotation_present_flag[i] | u(1) | |
|    fi_head_translation_present_flag[i] | u(1) | 1204 |
|    fi_eye_blinking_present_flag[i] | u(1) | |
|    fi_mouth_motion_present_flag[i] | u(1) | |
|    if(fi_head_location_present_flag[i]==1){ | | |
|       fi_location[i] | ue(v) | |
|    } | | |
|    if(fi_head_rotation_present_flag[i]==1){ | | |
|       fi_rotation_roll [i] | ue(v) | |
|       fi_rotation_pitch[i] | ue(v) | |
|       fi_rotation_ yaw[i] | ue(v) | |
|    } | | |
|    if(fi_head_translation_present_flag[i]==1){ | | |
|       fi_translation_x[i] | ue(v) | |
|       fi_translation_y[i] | ue(v) | |
|       fi_translation_z[i] | ue(v) | |
|    } | | |
|    if(fi_eye_blinking_present_flag[i]==1){ | | |
|       fi_eye[i] | ue(v) | |
|    } | | |

FIG. 12

| if(fi_mouth_motion_present_flag[i]==1){ | |
|---|---|
| fi_mouth_para1[i] | ue(v) |
| fi_mouth_para2[i] | ue(v) |
| fi_mouth_para3[i] | ue(v) |
| fi_mouth_para4[i] | ue(v) |
| fi_mouth_para5[i] | ue(v) |
| fi_mouth_para6[i] | ue(v) |
| } | |
| } | |
| } | |

FIG. 12 (Continued)

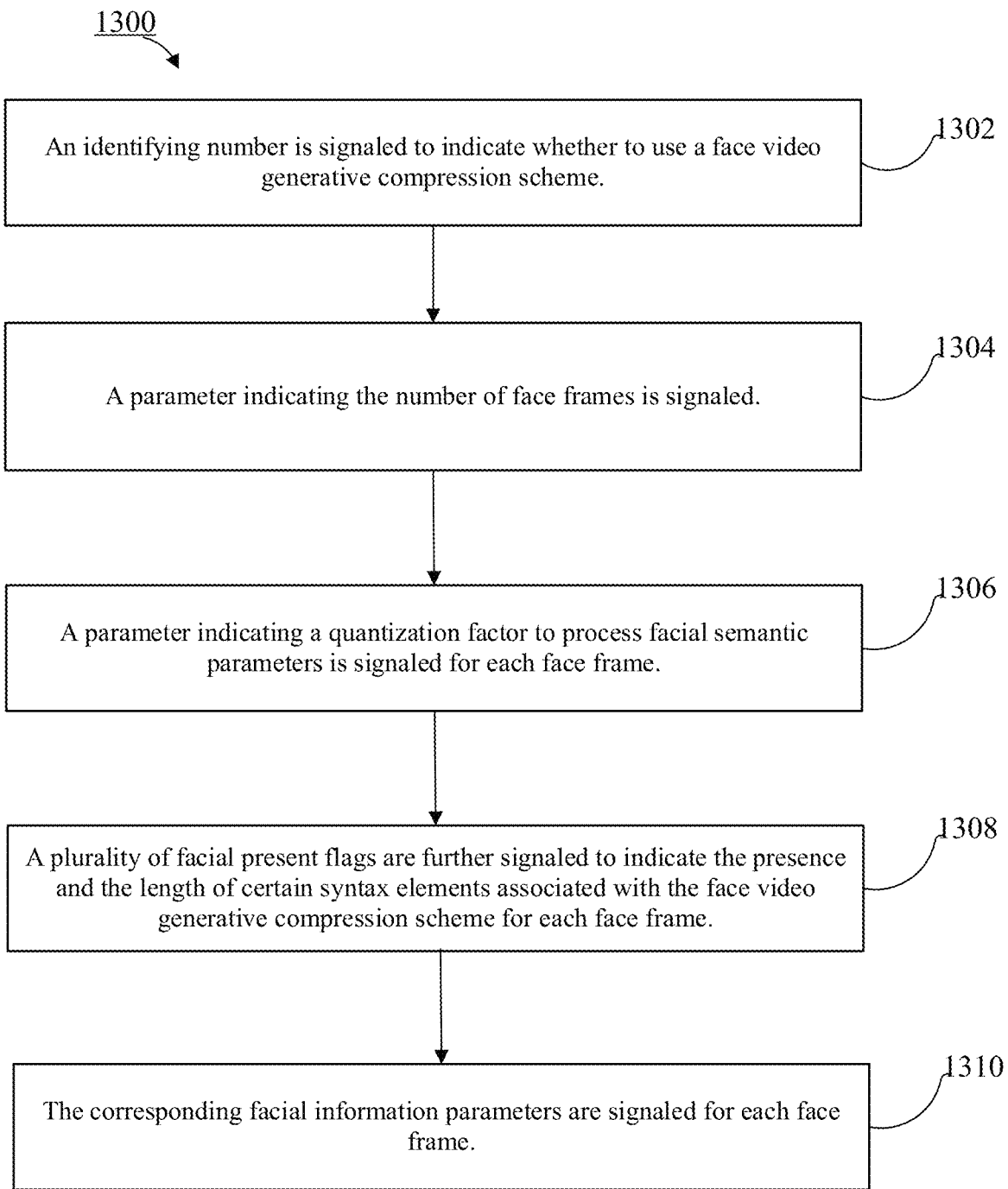

1300

An identifying number is signaled to indicate whether to use a face video generative compression scheme. — 1302

A parameter indicating the number of face frames is signaled. — 1304

A parameter indicating a quantization factor to process facial semantic parameters is signaled for each face frame. — 1306

A plurality of facial present flags are further signaled to indicate the presence and the length of certain syntax elements associated with the face video generative compression scheme for each face frame. — 1308

The corresponding facial information parameters are signaled for each face frame. — 1310

FIG. 13

Table 3: Exemplary syntax of the proposed face video generative compression SEI message

| Face_information( payloadSize ) { | Descriptor |
|---|---|
| fi_id | ue(v) |
| fi_num_set_of_parameter | u(9) |
| for( i=0; i<fi_num_set_of_parameter;i++){ | |
| fi_quantization_factor[i] | |
| fi_head_location_present_flag[i] | u(1) |
| fi_head_rotation_present_flag[i] | u(1) |
| fi_head_translation_present_flag[i] | u(1) |
| fi_eye_blinking_present_flag[i] | u(1) |
| fi_mouth_motion_present_flag[i] | u(1) |
| if(fi_head_location_present_flag[i]==1){ | |
| fi_location[i] | ue(v) |
| } | |
| if(fi_head_rotation_present_flag[i]==1){ | |
| fi_rotation_roll [i] | ue(v) |
| fi_rotation_pitch[i] | ue(v) |
| fi_rotation_ yaw[i] | ue(v) |
| } | |
| if(fi_head_translation_present_flag[i]==1){ | |
| fi_translation_x[i] | ue(v) |
| fi_translation_y[i] | ue(v) |
| fi_translation_z[i] | ue(v) |
| } | |
| if(fi_eye_blinking_present_flag[i]==1){ | |
| fi_eye[i] | ue(v) |
| } | |

| if(fi_mouth_motion_present_flag[i]==1){ | |
|---|---|
| fi_mouth_para1[i] | ue(v) |
| fi_mouth_para2[i] | ue(v) |
| fi_mouth_para3[i] | ue(v) |
| fi_mouth_para4[i] | ue(v) |
| fi_mouth_para5[i] | ue(v) |
| fi_mouth_para6[i] | ue(v) |
| } | |
| } | |
| } | |

FIG. 14 (Continued)

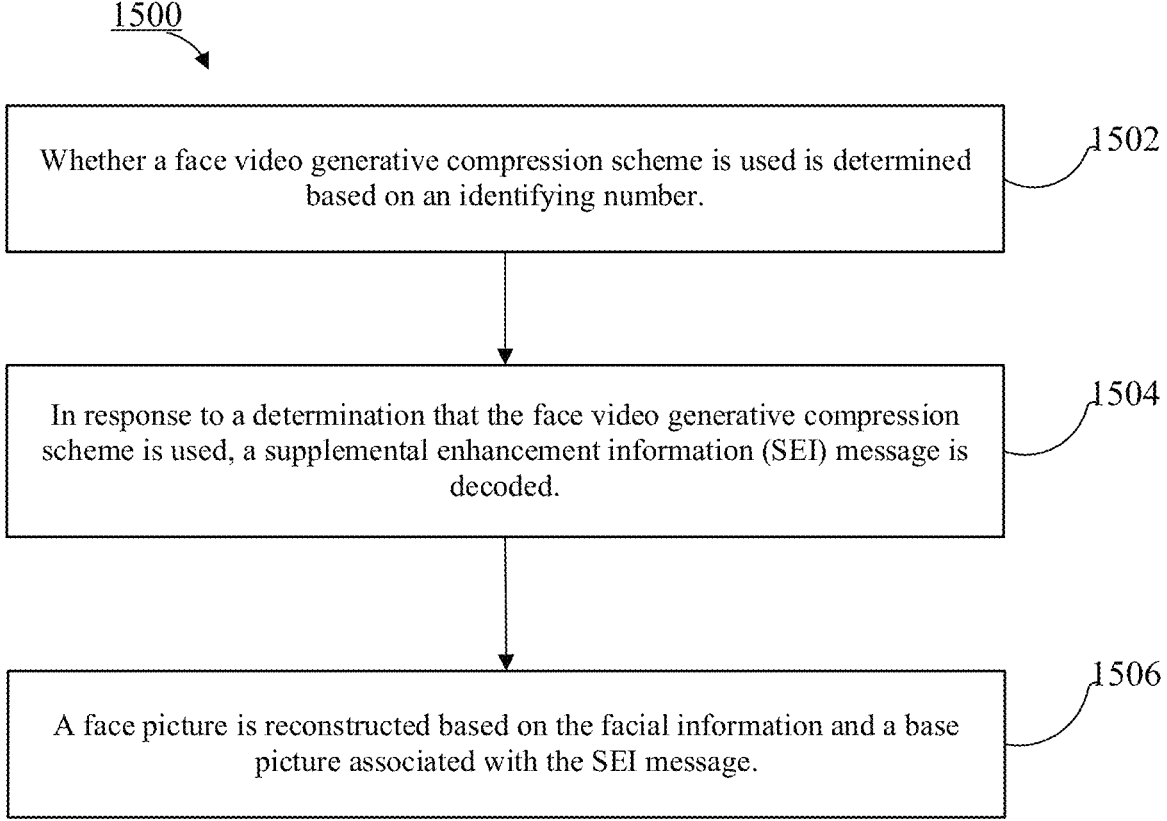

1500

Whether a face video generative compression scheme is used is determined based on an identifying number. ⟋1502

In response to a determination that the face video generative compression scheme is used, a supplemental enhancement information (SEI) message is decoded. ⟋1504

A face picture is reconstructed based on the facial information and a base picture associated with the SEI message. ⟋1506

FIG. 15

METHOD AND APPARATUSES FOR USING FACE VIDEO GENERATIVE COMPRESSION SEI MESSAGE

CROSS-REFERENCE TO RELATED APPLICATIONS

The disclosure claims the benefits of priority to U.S. Provisional Application No. 63/436,626, filed Jan. 1, 2023, which is incorporated herein by reference in its entirety.

TECHNICAL FIELD

The present disclosure generally relates to video processing, and more particularly, to methods and apparatuses for using face video generative compression supplemental enhancement information (SEI) messages.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method of decoding a bitstream to output one or more pictures for a video stream. The method includes: receiving a bitstream; and decoding, using coded information of the bitstream, one or more pictures. The decoding includes determining, based on an identifying number, whether a face video generative compression scheme is used; in response to a determination that the face video generative compression scheme is used, decoding a supplemental enhancement information (SEI) message, the SEI message comprising facial information; and reconstructing a face picture based on the facial information and a base picture associated with the SEI message.

Embodiments of the present disclosure provide a method of encoding a video sequence into a bitstream. The method includes receiving a video sequence; encoding one or more pictures of the video sequence; and generating a bitstream. The encoding includes: signaling an identifying number indicating whether a face video generative compression scheme is used.

Embodiments of the present disclosure provide a non-transitory computer readable storage medium storing a bitstream of a video. The bitstream includes: a supplemental enhancement information (SEI) message, the SEI message comprising facial information, wherein the facial information is used for reconstructing a face picture based on a base picture associated with the face picture.

BRIEF DESCRIPTION OF THE DRAWINGS

Embodiments and various aspects of the present disclosure are illustrated in the following detailed description and the accompanying figures. Various features shown in the figures are not drawn to scale.

FIG. 8 is a flowchart of an exemplary method for processing video based on face video generative compression supplemental enhancement information (SEI) messages, according to some embodiments of the present disclosure.

FIG. 9 is a flowchart of an exemplary method for processing video based on face video generative compression supplemental enhancement information (SEI) messages, according to some embodiments of the present disclosure.

FIG. 10 shows an exemplary syntax of the disclosed face video generative compression SEI message, according to some embodiments of the present disclosure.

FIG. 11 is a flowchart of an exemplary method for processing video based on face video generative compression supplemental enhancement information (SEI) messages, according to some embodiments of the present disclosure.

FIG. 12 shows another exemplary syntax of the disclosed face video generative compression SEI message, according to some embodiments of the present disclosure.

FIG. 13 is a flowchart of an exemplary method for processing video based on face video generative compression supplemental enhancement information (SEI) messages, according to some embodiments of the present disclosure.

FIG. 14 shows another exemplary syntax of the disclosed face video generative compression SEI message, according to some embodiments of the present disclosure.

FIG. 15 is a flowchart of an exemplary method for processing video based on face video generative compression supplemental enhancement information (SEI) messages, according to some embodiments of the present disclosure.

DETAILED DESCRIPTION

Figure 1:
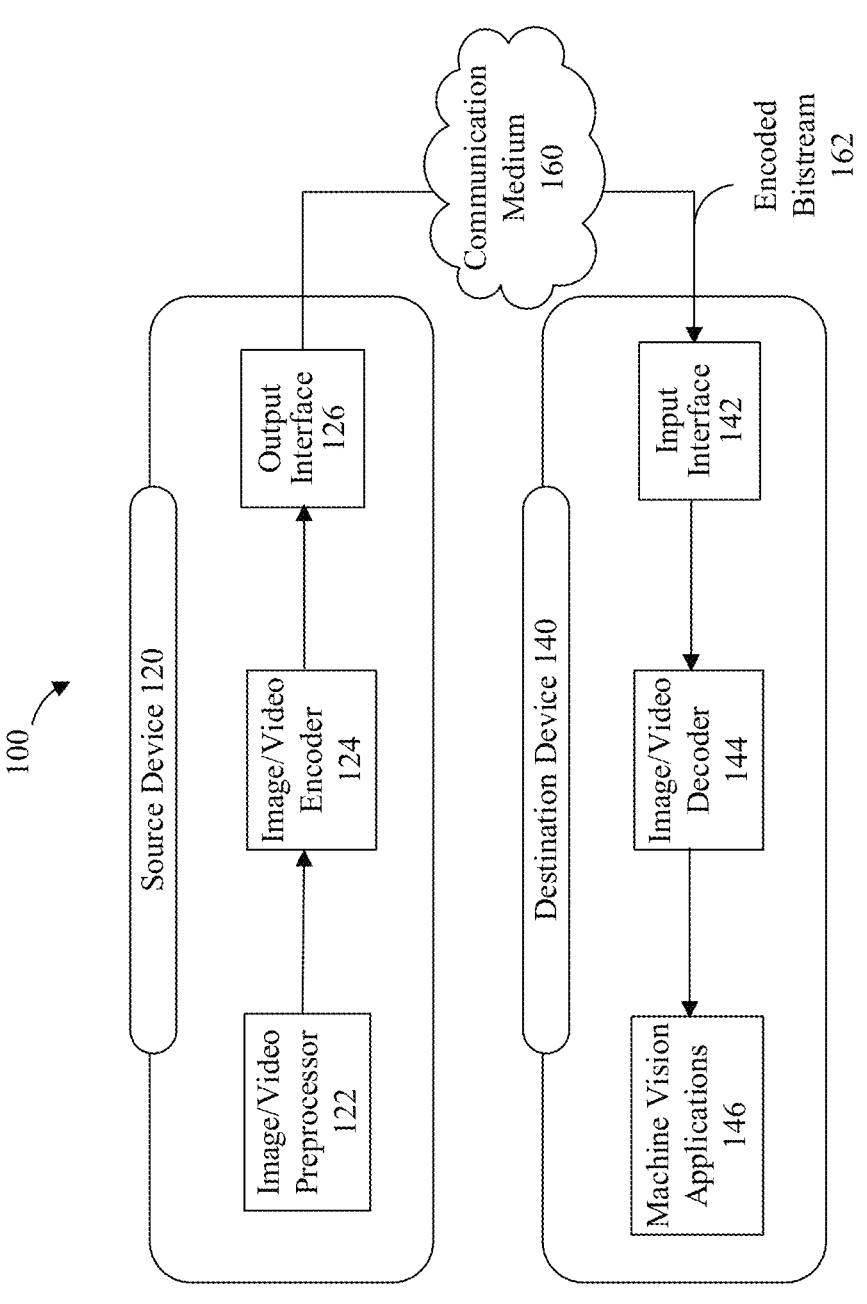
FIG. 1 is a schematic diagram illustrating an exemplary system for preprocessing and coding image data, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques (such as those utilized by image/video encoder 124 and image/video decoder 144) are described in connection with FIGS. 2A-2B and FIGS. 3A-3B.

Figure 2A:
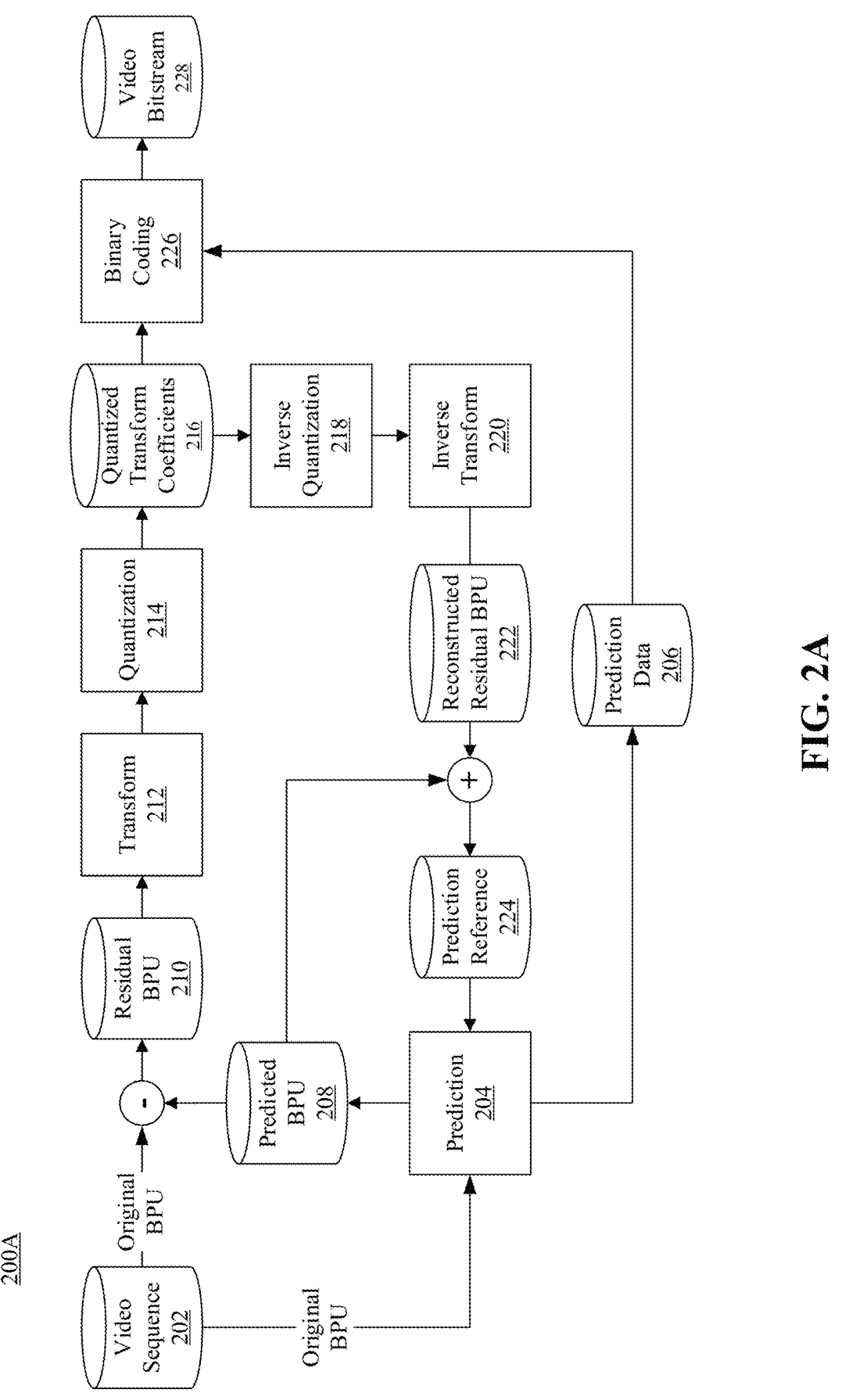
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
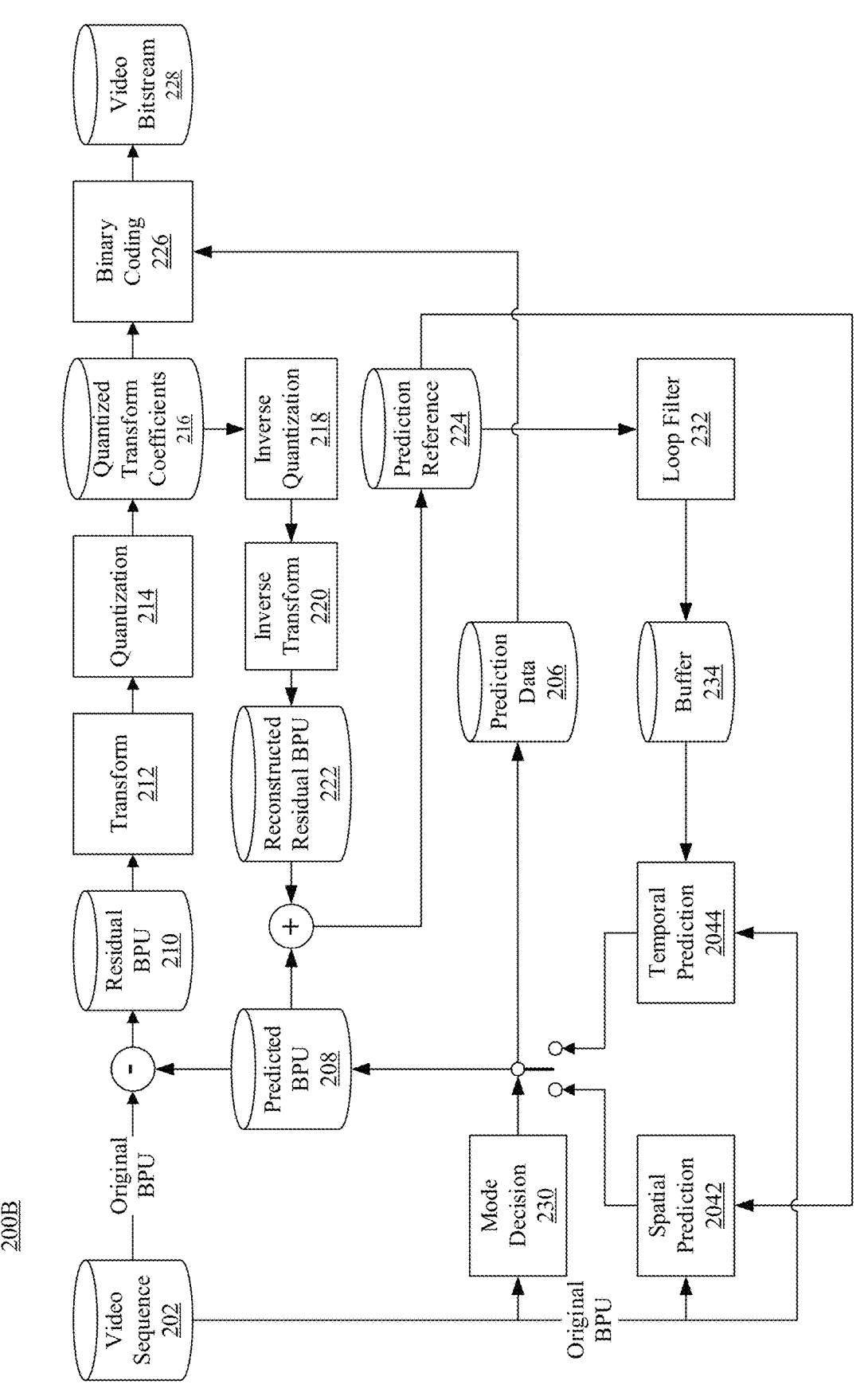
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed image as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
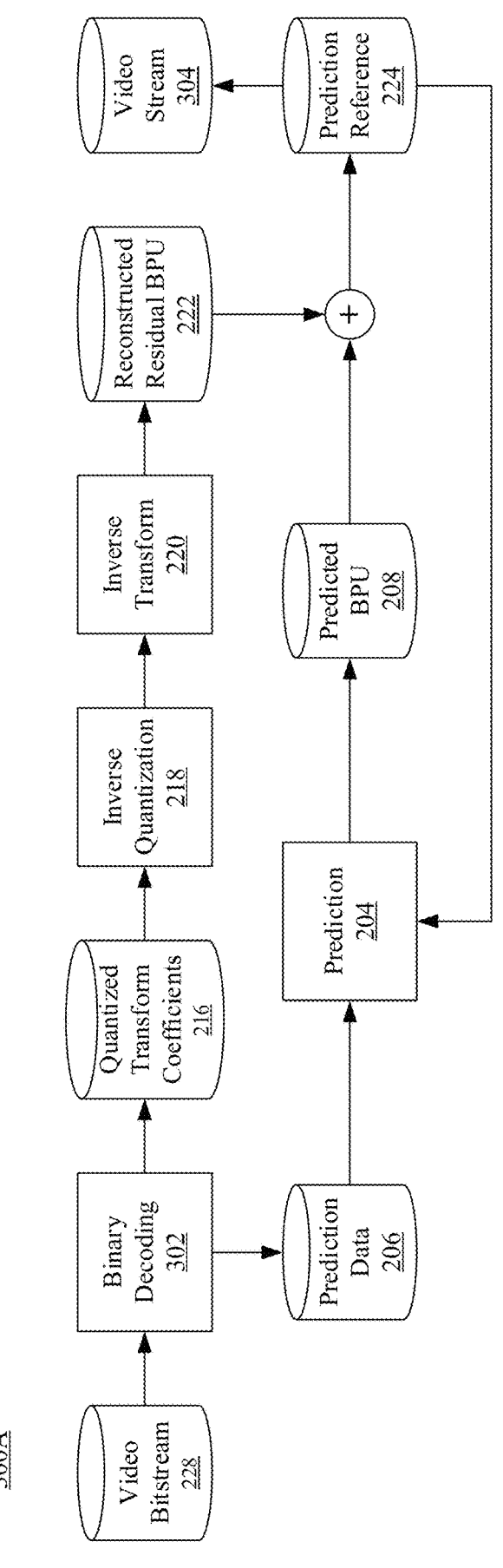
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202.

However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer (DPB) in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
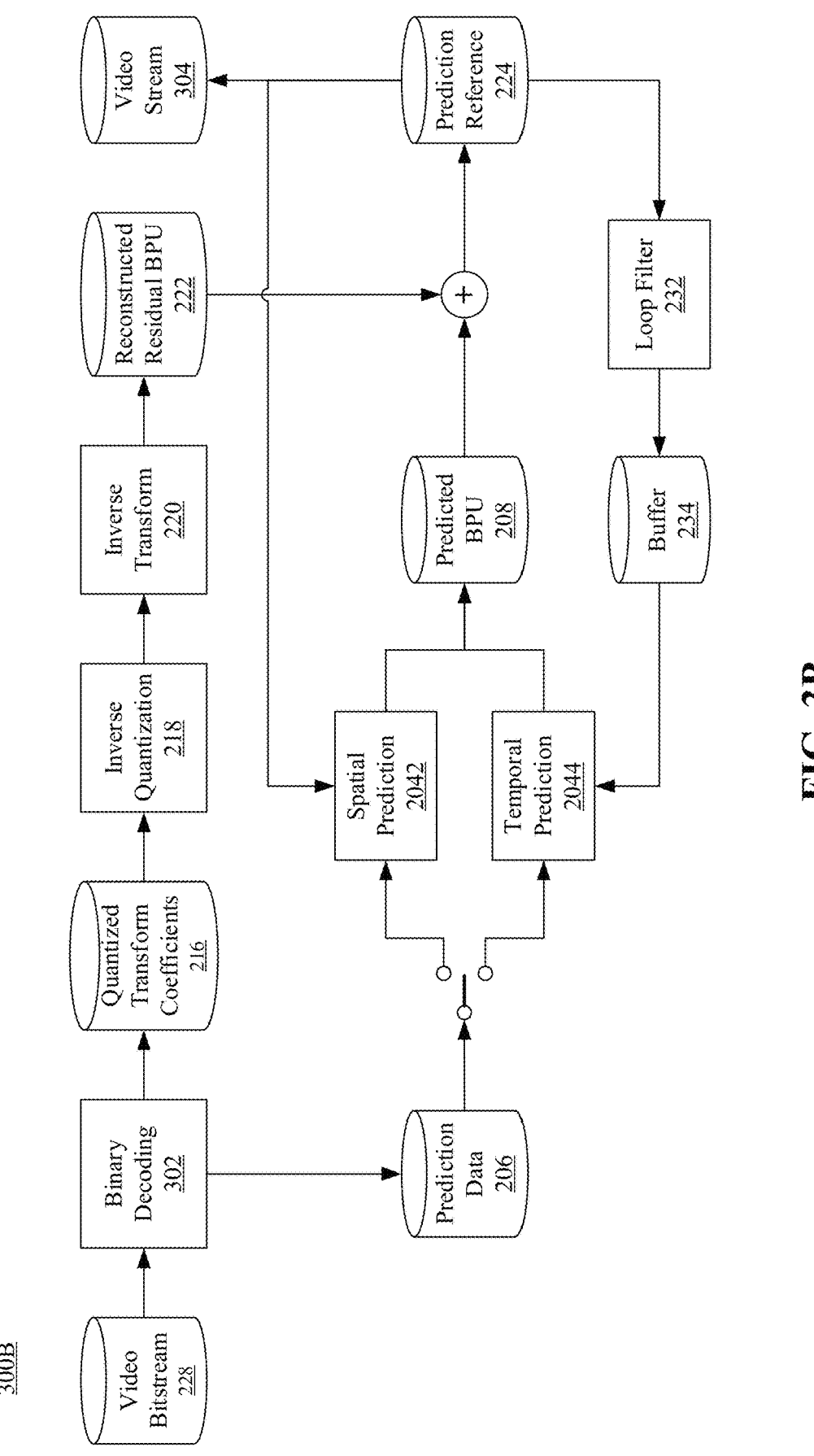
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
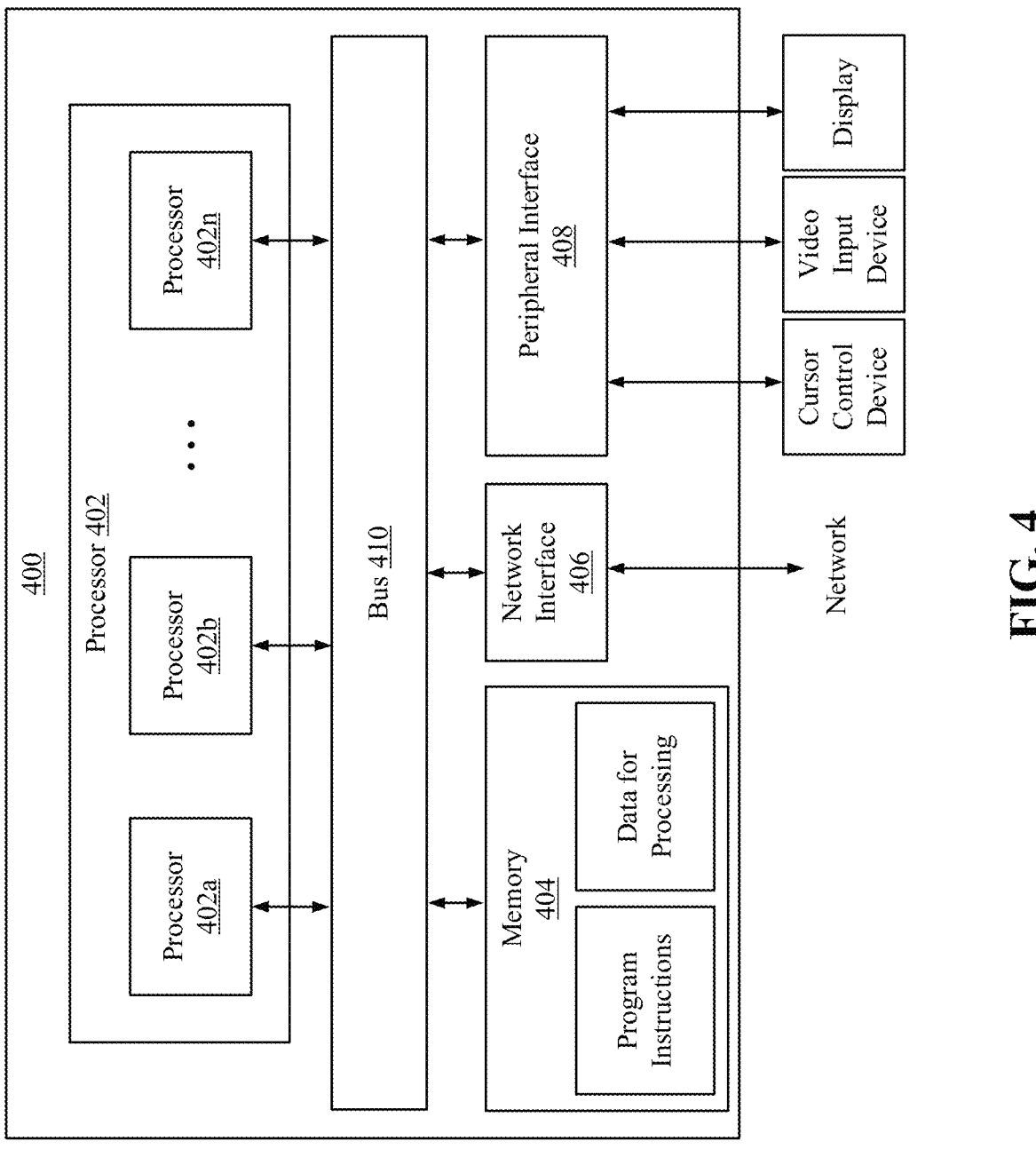
FIG. 4 is a block diagram of an exemplary apparatus for preprocessing or coding image data, according to some embodiments of the present disclosure.

Referring back to FIG. 1, each image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Supplemental enhancement information (SEI) messages are intended to be conveyed within coded video bitstream in a manner specified in a video coding specification or to be conveyed by other means determined by the specifications for systems that make use of such coded video bitstream. SEI messages can contain various types of data that indicate the timing of the video pictures or describe various properties of the coded video or how it can be used or enhanced. SEI messages are also defined that can contain arbitrary user-defined data. SEI messages do not affect the core decoding process, but can indicate how the video is recommended to be post-processed or displayed.

With the emergence of deep generative models including Variational Auto-Encoding (VAE) and Generative Adversarial Networks (GAN), the facial video compression can achieve promising performance improvement. For example, X2Face can be used to control face generation via images, audio, and pose codes. Besides, realistic neural talking head models can be used via few-shot adversarial learning. For Video-to-video synthesis tasks, Face-vid2vid can be used. Moreover, schemes that leverage compact 3D keypoint representation to drive a generative model for rendering the target frame can also be used. Moreover, mobile-compatible video chat systems based on FOMM can be used. VSBNet that utilizes the adversarial learning to reconstruct origin frames from the landmarks can also be used. In addition, an end-to-end talking-head video compression framework based upon compact feature learning (CFTE), designed for high efficiency talking face video compression towards ultra-low bandwidth scenarios can be used. The CFTE scheme leverages the compact feature representation to compensate for the temporal evolution and reconstruct the target face video frame in an end-to-end manner. Moreover, the CFTE scheme can be incorporated into the video coding framework with the supervision of rate-distortion objective. Although these algorithms realize frame reconstruction with a few facial parameters through the powerful rendering ability of deep generative models, some head posture movements and facial expression movements still fail to be accurately rendered compared with the original moving video.

Figure 5:
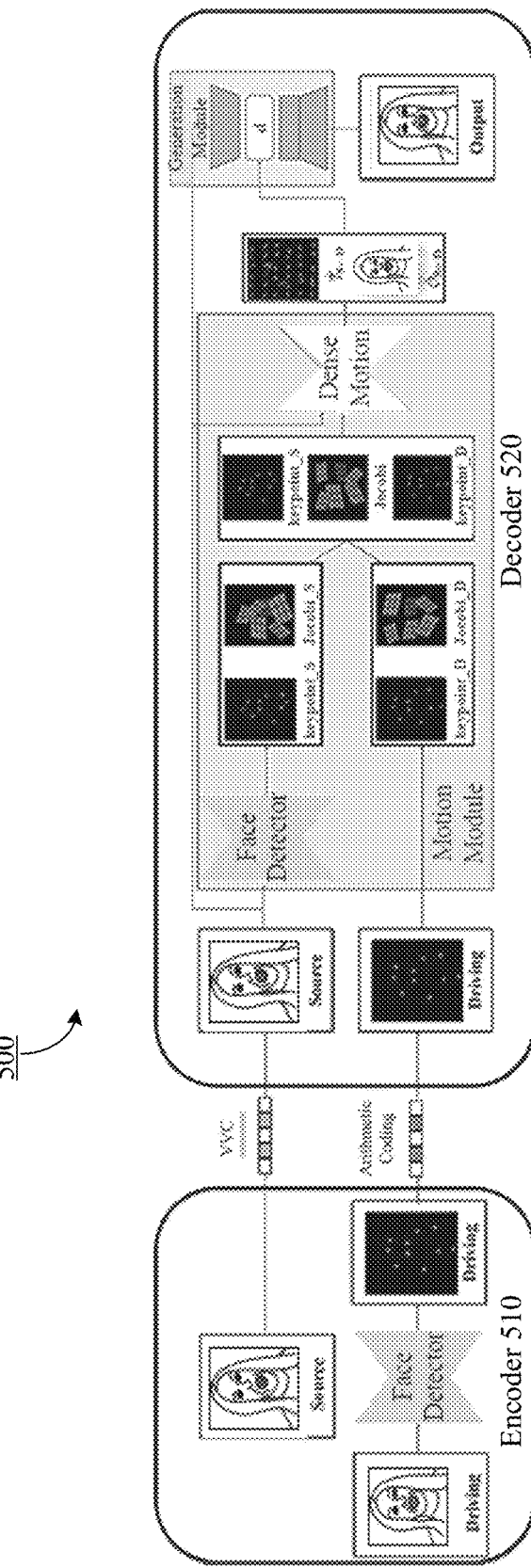
FIG. 5 is a schematic diagram illustrating an exemplary deep learning based video generative compression framework, according to some embodiments of the present disclosure.

FIG. 5 is a schematic diagram illustrating an exemplary deep learning based video generative compression framework 500, according to some embodiments of the present disclosure. Framework 500 is suitable for compressing and generating talking face videos. For example, framework 500 can be based on the First Order Motion Model (FOMM). The FOMM deforms a reference source frame to follow the motion of a driving video. While this method works on various types of videos (for example, motion pictures, cartoons), this method can also be used for face animation applications. FOMM follows an encoder-decoder architecture with a motion transfer component including the following steps.

Firstly, a keypoint extractor (also referred to as a motion module) is learned using an equivariant loss, without explicit labels. By this keypoint extractor, two sets of ten learned keypoints are computed for the source and driving frames. The learned keypoints are transformed from the feature map with the size of channel×64×64 via the Gaussian map function, thus every corresponding keypoint can represent different channels feature information. It should be mentioned that every keypoint is point of (x, y) that can represent the most important information of feature map.

Secondly, a dense motion network uses the landmarks and the source frame to produce a dense motion field and an occlusion map.

Then, the encoder 510 encodes the source frame via the traditional image/video compression method, such as HEVC/VVC or JPEG/BPG. Here, the VVC is used to compress the source frame.

In the later stage, the resulting feature map is warped using the dense motion field (using a differentiable grid-sample operation), then multiplied with the occlusion map.

Lastly, the decoder 520 generates an image from the warped map.

Figure 6:
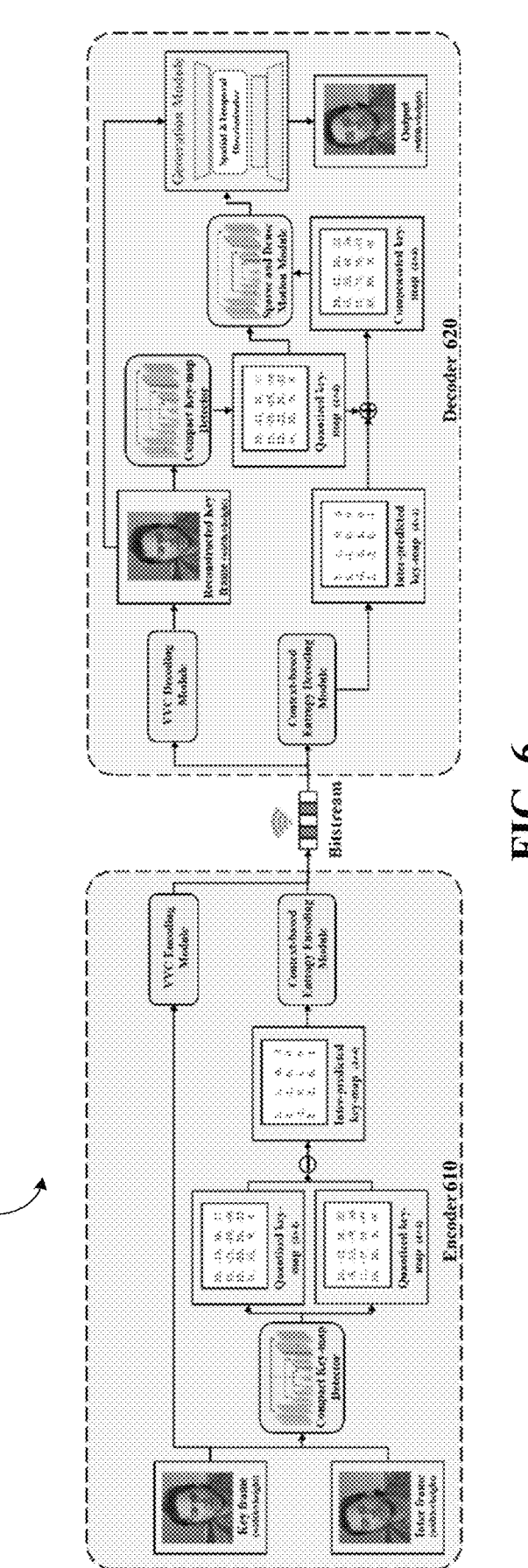
FIG. 6 is a schematic diagram illustrating an exemplary encoder-decoder coding framework with the 1×4×4 compact feature size for a talking face video, according to some embodiments of the present disclosure.

FIG. 6 is a schematic diagram illustrating an exemplary encoder-decoder coding framework 600 with the 1×4×4 compact feature size for a talking face video, according to some embodiments of the present disclosure. FIG. 6 gives another basic framework of the deep-based video generative compression scheme based on compact feature representation, namely CFTE. It follows an encoder-decoder architecture that applies a context-based coding scheme.

At the encoder 610 side, the compression framework includes three modules: an encoder (also referred to as VVC encoding module) for compressing the key frame, a feature extractor for extracting the compact human features of the other inter frames, and a feature coding module for compressing the inter-predicted residuals of compact human features. First, the key frame that represents the human textures is compressed with the VVC encoder. Through the compact feature extractor, each of the subsequent inter frames is represented with a compact feature matrix with the size of 1×4×4. It should be mentioned that the size of compact feature matrix is not fixed, and the number of feature parameters can also be increased or decreased according to the specific requirement of bit consumption. Then, these extracted features are inter-predicted and quantized, and the residuals are finally entropy-coded as the final bitstream.

At the decoder 620 side, this compression framework also contains three main modules, including decoding for reconstructing the key frame, the reconstruction of the compact features by entropy decoding and compensation, and the generation of the final video by leveraging the reconstructed features and decoded key frame. More specifically, during the generation of the final video, the decoded key frame from the VVC bitstream can be further represented in the form of features through compact feature extraction. Subsequently, given the features from the key and inter frames, relevant sparse motion field is calculated, facilitating the generation of the pixel-wise dense motion map and occlusion map. Finally, based on deep generative model, the decoded key frame, pixel-wise dense motion map and occlusion map with implicit motion field characterization are used to produce the final video with accurate appearance, pose, and expression.

To further pursue the coding performance, numerous studies focusing on 3D face have been conducted. A 3D head model is adopted and only the pose parameters for the task of face-specific video compression are encoded. Subsequently, both Eigenspaces and Principal Component Analysis (PCA) models have been used in this task. However, based on these traditional 3D techniques, the visual quality of the reconstructed images is unacceptable. With the development of deep generative models, this 3DMM-assisted face video generation task can provide promising results.

Figure 7:
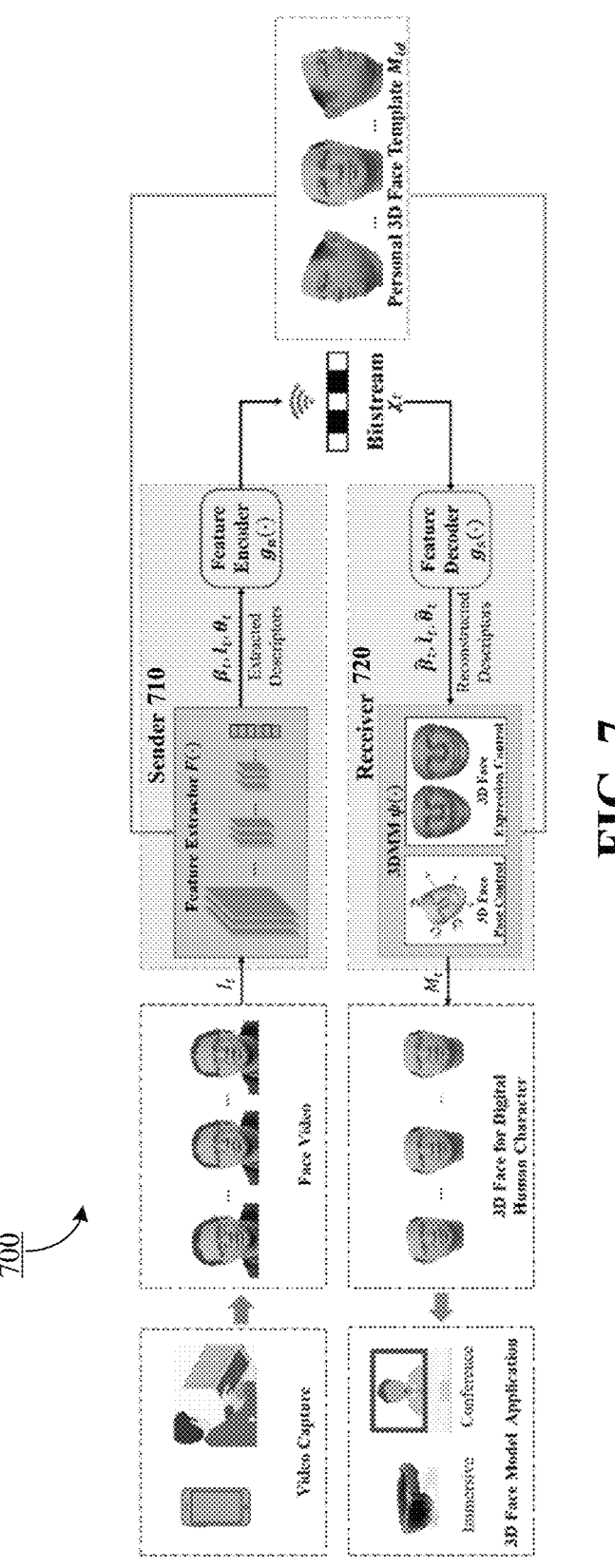
FIG. 7 is a schematic diagram illustrating a general encoder-decoder generative compression framework of 3DMM-assisted talking face video, according to some embodiments of the present disclosure.

FIG. 7 is a schematic diagram illustrating a general encoder-decoder generative compression framework 700 of 3DMM-assisted talking face video, according to some embodiments of the present disclosure. Generally speaking, the 3DMM-assisted face video generation can provide accurate 3D face reconstruction based on the combination of shape $\mathcal{S}$ and texture $\mathcal{T}$, , which are given by:

$$S = \mathcal{S}(\alpha, \beta) = \overline{S} + B_{id}\alpha + B_{exp}\beta$$

$$\mathcal{T} = \mathcal{T}(\delta) = \overline{\mathcal{T}} + B_t\delta$$

where $\overline{S}$ and $\overline{\mathcal{T}}$ denote average identity and texture, and the basis vectors of the identity, expression and texture space are represented with $B_{id}$, $B_{exp}$, $B_t$. The face identity, expression and texture are represented with the $\alpha$, $\beta$ and $\delta$, which are corresponding feature vectors to control the reconstructed face. Furthermore, the pose and position of the 3D face are controlled by angle $\theta$ and translation l. As a result, at the encoder side (e.g., sender 710), the 3DMM parameters that serve as the feature descriptors of the 3D face are compressed. Furthermore, the decoder (e.g., receiver 720) receives the bitstream to reconstruct 3DMM template (e.g., 3D face mesh, 3D face landmark and etc.). The reconstructed 3D information from source image and driving image are used as guidance to learn the optical flow needed for the re-enacted face synthesis.

The existing SEI messages used in the current VVC standard are not designed to handle the task of face video compression. However, face video can be described by the variations of feature structures with strong priors, such as landmarks or keypoints, even be parameterized into a series of facial semantic information to represent the status of head posture and face expression. Such compact facial semantics can give a great space to implement the syntax design and semantic description of SEI message for face video compression.

In addition, face video communication has called for more common use cases, such as face video retargeting or animation, except face video reconstruction. For example, with the popularity of metaverse-activities, real-world facial movement may need to be transferred to the virtual metaverse world and represented by another person. Moreover, the reconstruction of face video is expected to be more in line with the real situation and make corresponding retargeting. Therefore, there is a need to define face video compression SEI messages that can contain various types of data for indicating the timing of the video pictures and/or describing various properties of the coded video or how it can be used or enhanced. As such, the post-processing or displaying of the reconstructed face video can satisfy the users' actual needs in a user-friendly manner.

To solve the above problems, a new SEI message, referred to as face video generative compression SEI message, is proposed in the present disclosure. The proposed SEI has at least the following two functions: (1) reconstruct high-quality talking face video at ultra-low bitrate, and (2) manipulate the talking face video towards personalized characterization. As such, the proposed SEI is applicable to video conferencing, live entertainment, and metaverse-related activities.

FIG. 8 is a flowchart of an exemplary method 800 for processing video based on face video generative compression supplemental enhancement information (SEI) messages, according to some embodiments of the present disclosure. Method 800 describes a general syntax structure and syntax element order of the face video generative compression SEI message. Referring to FIG. 8, method 800 may include the following steps 802 to 808.

At step 802, an identifying number is signaled to indicate whether to use a face video generative compression scheme.

At step 804, when the identifying number indicates that the face video generative compression scheme is used, multiple (e.g., 5) facial present flags are further signaled to indicate the presence and the length of certain syntax elements associated with the face video generative compression scheme. In some embodiments, the facial present flags may include flags indicating head location, head rotation, head translation, eye blinking, and mouth motion, etc.

At step 806, one or more corresponding facial information parameters are signaled. In some embodiments, the corresponding facial information parameters may include head information parameters (e.g., a head location parameter, a head rotation parameter, a head translation parameter, etc.), an eyes information parameter (e.g., a eyes blinking parameter, etc.), and mouth information parameters (e.g., month motion parameters, etc.). In some embodiments, the head location corresponds to the facial information contained in the face video. The head rotation further includes three degrees of freedom, for example, roll, pitch, or yaw. The head translation may further include translations in three directions, for example, in a 3D coordinate system. The mouth motion parameters may further include a plurality of parameters indicating the motion information of mouth.

At step 808, the signaled corresponding facial information parameters are used to reconstruct or retarget the related face part based on a base picture.

Some exemplary embodiments about the proposed face video generative compression SEI messages are described below in detail.

In some embodiments, the plurality of facial present flags indicating the presence and the length of certain syntax elements associated with the face video generative compression scheme and the parameter indicating a quantization factor to process facial semantic parameters are signaled for all the face frames.

FIG. 9 is a flowchart of an exemplary method 900 for processing video based on face video generative compression supplemental enhancement information (SEI) messages, according to some embodiments of the present disclosure. FIG. 10 shows an exemplary syntax of the disclosed face video generative compression SEI message, according to some embodiments of the present disclosure. Method 900 describes a general syntax structure and syntax element order of the face video generative compression SEI message. Method 900 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 900. In some embodiments, method 900 can be implemented by a computer program product, embodied in a computer-readable medium, including computer-executable instructions, such as program code, executed by computers (e.g., apparatus 400 of FIG. 4). Referring to FIG. 9 and FIG. 10, method 900 may include the following steps 902 to 910.

At step 902, an identifying number (e.g., fi_id) is signaled to indicate whether to use a face video generative compression scheme, referring to 1001 shown in FIG. 10.

At step 904, a parameter indicating the number of face frames is signaled, e.g., fi_num_set_of_parameter, referring to 1002 shown in FIG. 10.

At step 906, a parameter indicating a quantization factor to process facial semantic parameters is signaled for all the face frames, referring to 1003 shown in FIG. 10. The facial sematic parameters may include 14 facial semantic parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3 [i], fi_mouth_para4[i], fi_mouth_para5[i] and fi_mouth_para6[i]).

At step 908, a plurality of facial present flags are further signaled to indicate the presence and the length of certain syntax elements associated with the face video generative compression scheme for all the face frames, referring to 1004 shown in FIG. 10.

At step 910, the corresponding facial information parameters are signaled for each face frame.

The process consistent with FIGS. 9 and 10 is described as follows.

First, the face video generative compression contains an identifying number that may be used to identify a face video generative compression filter.

Second, every SEI message always has a base picture (i.e., the first face frame in the face sequence) contained in the PU. The base picture can provide a texture reference such that the facial information parameters carried in the SEI message can be used to reconstruct face frames.

Third, for these facial information parameters in the SEI message, 5 corresponding facial information parameters present flags (i.e., fi_head_location_present_flag, fi_head_rotation_present_flag, fi_head_translation_present_flag, fi_eye_blinking_present_flag and fi_mouth_motion_present_flag of sequence 1004) are signaled to determine whether the related facial information parameters are transmitted or not. If these parameters are not transmitted, the corresponding facial information parameters from the base picture are copied to generate the subsequent face frames.

Fourth, when fi_head_location_present_flag, is present, the head location parameter fi_location[i] shall be carried in the SEI message. When fi_head_rotation_present_flag is present, these head rotation parameters (fi_rotation_roll [i], fi_rotation_pitch [i] and fi_rotation_yaw[i]) shall be carried in the SEI message. When fi_head_translation_present_flag is present, these head translation parameters (fi_translation_x [i], fi_translation_y[i] and fi_translation_z[i]) shall be carried in the SEI message. When fi_eye_blinking_present_flag is present, the eye blinking parameter fi_eye[i] shall be carried in the SEI message. When fi_mouth_motion_present_flag is present, these mouth motion parameters (fi_mouth_para1 [i], fi_mouth_para2[i], fi_mouth_para3[i], fi_mouth_para4[i], fi_mouth_para5[i] and fi_mouth_para6 [i]) shall be carried in the SEI message. If the related flags are not present, the corresponding facial information parameters from the based picture will be copied to generate the subsequent face pictures, i.e., these 14 facial parameters of these generated face pictures keep the same with base picture.

Fifth, when these corresponding facial information parameters are carried in this SEI message, the face video can be reconstructed towards personalized characterization or user-friendly manner via the strong generation ability of generative adversarial network.

The semantics associated with the syntax in FIG. 10 are described as follows.

fi_id contains an identifying number that may be used to identify a face video generative compression filter. The value of fi_id can be in the range of 0 to $2^{32}$-2, inclusive.

fi_num_set_of_parameter indicates the number of face frames can use the face video generative compression filter to achieve the face video generative compression. The value of fi_num_set_of_parameter shall be in the range of 0 to $2^{10}$, inclusive. If exceeds, other face frames can be packaged into the next SEI message.

fi_quantization_factor is quantization factor to process these 14 facial semantic parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3[i], fi_mouth_para4[i], fi_mouth_para5[i] and fi_mouth_para6[i]) with the float 16 type. These float 16 parameters can be further enlarged via the fi_quantization_factor, where the value of fi_quantization_factor can be in the range of 0 to 1016. For example, the value of original facial parameter is 0.1234567891234567 and the value of fi_quantization_factor is 106, thus its corresponding quantized facial parameter will be 123456.

fi_head_location_present_flag is equal to 1 when present and fi_head_location_present_flag is equal to 0 when not present.

fi_location[i], when i is not equal to 0, specifies the quantized residual parameter corresponding to head location between the i_th face frame and (i-1)_th face frame via fi_quantization_factor. When i is equal to 0, fi_location[0] specifies the quantized head location parameter from 0_th face frame (base picture).

fi_head_rotation_present_flag is equal to 1 when present and fi_head_rotation_present_flag is equal to 0 when not present.

fi_rotation_roll[i], when i is not equal to 0, specifies the quantized residual parameter corresponding to head rotation around the front-to-back axis (called roll) between the i_th face frame and (i-1)_th face frame via fi_quantization_factor. When i is equal to 0, fi_rotation_roll[0] specifies the quantized front-to-back-axis head rotation parameter from 0_th face frame (base picture).

fi_rotation_pitch[i], when i is not equal to 0, specifies the quantized residual parameter corresponding to head rotation around the side-to-side axis (called pitch) between the i_th face frame and (i-1)_th face frame via fi_quantization_factor. When i is equal to 0, fi_rotation_pitch [0] specifies the quantized side-to-side-axis head rotation parameter from 0_th face frame (base picture).

fi_rotation_yaw[i], when i is not equal to 0, specifies the quantized residual parameter corresponding to head rotation around the vertical axis (called yaw) between the i_th face frame and (i-1)_th face frame via fi_quantization_factor. When i is equal to 0, fi_rotation_yaw[0] specifies the quantized vertical-axis head rotation parameter from 0_th face frame (base picture).

fi_head_translation_present_flag is equal to 1 when present and fi_head_translation_present_flag is equal to 0 when not present.

fi_translation_x[i], when i is not equal to 0, specifies the quantized residual parameter corresponding to head translation around the x axis between the i_th face frame and (i-1)_th face frame via fi_quantization_factor. When i is equal to 0, fi_translation_x[0] specifies the quantized x-axis head translation parameter from 0_th face frame (base picture).

fi_translation_y[i], when i is not equal to 0, specifies the quantized residual parameter corresponding to head translation around the y axis between the i_th face frame and (i-1)_th face frame via fi_quantization_factor. When i is equal to 0, fi_translation_y[0] specifies the quantized y-axis head translation parameter from 0_th face frame (base picture).

fi_translation_z[i], when i is not equal to 0, specifies the quantized residual parameter corresponding to head translation around the z axis between the i_th face frame and (i-1)_th face frame via fi_quantization_factor. When i is equal to 0, fi_translation_z[0] specifies the quantized z-axis head translation parameter from 0_th face frame (base picture).

fi_eye_blinking_present_flag is equal to 1 when present and fi_eye_blinking_present_flag is equal to 0 when not present.

fi_eye[i], when i is not equal to 0, specifies the quantized residual parameter corresponding to eye blinking degree between the i_th face frame and (i-1)_th face frame via fi_quantization_factor. When i is equal to 0, fi_eye[0] specifies the quantized eye blinking parameter from 0_th face frame (base picture).

fi_mouth_motion_present_flag is equal to 1 when present and fi_mouth_motion_present_flag is equal to 0 when not present.

fi_mouth_para1[i], when i is not equal to 0, specifies the quantized residual parameter corresponding to mouth motion between the i_th face frame and (i-1)_th face frame via fi_quantization_factor. When i is equal to 0, fi_mouth_para1[0] specifies the quantized mouth motion parameter from 0_th face frame (base picture).

fi_mouth_para2[i], when i is not equal to 0, specifies the quantized residual parameter corresponding to mouth motion between the i_th face frame and (i-1)_th face frame via fi_quantization_factor. When i is equal to 0, fi_mouth_para2[0] specifies the quantized mouth motion parameter from 0_th face frame (base picture).

fi_mouth_para3[i], when i is not equal to 0, specifies the quantized residual parameter corresponding to mouth motion between the i_th face frame and (i-1)_th face frame via fi_quantization_factor. When i is equal to 0, fi_mouth_para3[0] specifies the quantized mouth motion parameter from 0_th face frame (base picture).

fi_mouth_para4[i], when i is not equal to 0, specifies the quantized residual parameter corresponding to mouth motion between the i_th face frame and (i-1)_th face frame via fi_quantization_factor. When i is equal to 0, fi_mouth_para4[0] specifies the quantized mouth motion parameter from 0_th face frame (base picture).

fi_mouth_para5[i], when i is not equal to 0, specifies the quantized residual parameter corresponding to mouth motion between the i_th face frame and (i-1)_th face frame via fi_quantization_factor. When i is equal to 0, fi_mouth_para5[0] specifies the quantized mouth motion parameter from 0_th face frame (base picture).

fi_mouth_para6[i], when i is not equal to 0, specifies the quantized residual parameter corresponding to mouth motion between the i_th face frame and (i-1)_th face frame via fi_quantization_factor. When i is equal to 0, fi_mouth_para6[0] specifies the quantized mouth motion parameter from 0_th face frame (base picture).

In some embodiments, the plurality of facial present flags indicating the presence and the length of certain syntax elements associated with the face video generative compression scheme are signaled for each face frame, respectively.

Moreover, while the above and below syntax definitions specify what occurs when a value is either 0 or 1, it is appreciated that these values are configurable and can be altered such that, for example, fi_head_location_present_flag being equal to 1 when not present and being equal to 0 when present.

FIG. 11 is a flowchart of an exemplary method 1100 for processing video based on face video generative compression supplemental enhancement information (SEI) messages, according to some embodiments of the present disclosure. FIG. 12 shows another exemplary syntax of the disclosed face video generative compression SEI message, according to some embodiments of the present disclosure. Method 1100 describes a general syntax structure and syntax element order of the face video generative compression SEI message. Method 1100 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 1100. In some embodiments, method 1100 can be implemented by a computer program product, embodied in a computer-readable medium, including computer-executable instructions, such as program code, executed by computers (e.g., apparatus 400 of FIG. 4). Referring to FIG. 11 and FIG. 12, method 1100 may include the following steps 1102 to 1110.

At step 1102, an identifying number (e.g., fi_id) is signaled to indicate whether to use a face video generative compression scheme, referring to 1201 shown in FIG. 12.

At step 1104, a parameter indicating the number of face frames is signaled, e.g., fi_num_set_of_parameter, referring to 1202 shown in FIG. 12.

At step 1106, a parameter indicating a quantization factor to process facial semantic parameters is signaled for all the face frames, referring to 1203 shown in FIG. 12. The facial information parameters may include 14 facial information parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3[i], fi_mouth_para4[i], fi_mouth_para5[i] and fi_mouth_para6[i]).

At step 1108, a plurality of facial present flags are further signaled to indicate the presence and the length of certain syntax elements associated with the face video generative compression scheme for each face frame, referring to 1204 shown in FIG. 12.

At step 1110, the corresponding facial information parameters are signaled for each face frame.

The process consistent with FIGS. 11 and 12 is described as follows.

First, the face video generative compression contains an identifying number that may be used to identify a face video generative compression filter.

Second, every SEI message always has a base picture (i.e., the first face frame in the face sequence) contained in the PU. The base picture can provide texture reference such that the facial information parameters carried in the SEI message can be used to reconstruct face frames.

Third, for these facial information parameters in the SEI message, it is proposed to set 5 corresponding facial information present flags (i.e., fi_head_location_present_flag[i], fi_head_rotation_present_flag[i], fi_head_translation_present_flag[i], fi_eye_blinking_present_flag[i] and fi_mouth_motion_present_flag[i]) to determine whether the related facial information parameters of every face picture [i] are transmitted or not.

Fourth, when fi_head_location_flag[i] is present, the head location parameter fi_location[i] can be carried in the SEI message. When fi_head_rotation_present_flag[i] is present, these head rotation parameters (fi_rotation_roll [i], fi_rotation_pitch [i] and fi_rotation_yaw[i]) shall be carried in the SEI message. When fi_head_translation_present_flag[i] is present, these head translation parameters (fi_translation_x [i], fi_translation_y[i] and fi_translation_z[i]) shall be carried in the SEI message. When fi_eye_blinking_flag[i] is present, the eye blinking parameter fi_eye[i] shall be carried in the SEI message. When fi_mouth_motion_present_flag[i] is present, these mouth motion parameters (fi_mouth_para1 [i], fi_mouth_para2[i], fi_mouth_para3[i], fi_mouth_para4 [i], fi_mouth_para5[i] and fi_mouth_para6[i]) shall be carried in the SEI message. When either of these 5 facial information present flags is not present, there are two situations according to the present disclosure.

In some embodiments, the facial information parameter for the current face frame (i.e., face frame[i]) is copied from the corresponding information from a previous face frame (i.e., face frame[i−1]). For the first face frame ([i-0]), the facial information parameter is copied from the base picture.

In some embodiments, the facial information parameter for the current face frame (i.e., face frame[i]) is copied from the base picture.

Fifth, when these corresponding facial information parameters are carried in this SEI message, the face video can be reconstructed towards personalized characterization or user-friendly manner via the strong generation ability of generative adversarial network.

The semantics associated with the syntax in FIG. 12 are given as follows.

fi_id contains an identifying number that may be used to identify a face video generative compression filter. The value of fi_id shall be in the range of 0 to $2^{32}$-2, inclusive.

fi_num_set_of_parameter indicates the number of face frames can use the face video generative compression filter to achieve the face video generative compression. The value of fi_num_set_of_parameter shall be in the range of 0 to 210, inclusive. If exceeds, other face frames need be packaged into the next SEI message.

fi_quantization_factor is quantization factor to process these 14 facial semantic parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3[i], fi_mouth_para4[i], fi_mouth_para5[i] and fi_mouth_para6[i]) with the float 16 type. These float 16 parameters shall be further enlarged via the fi_quantization_factor, where the value of fi_quantization_factor shall be in the range of 0 to $10^{16}$. For example, the value of original facial parameter is 0.1234567891234567 and the value of fi_quantization_factor is $10^6$, thus its corresponding quantized facial parameter will be 123456.

fi_head_location_present_flag[i] is equal to 1 when present and fi_head_location_present_flag is equal to 0 when not present.

fi_location[i], when i is not equal to 0, specifies the quantized residual parameter corresponding to head location between the i_th face frame and (i-1)_th face frame via fi_quantization_factor. When i is equal to 0, fi_location[0] specifies the quantized head location parameter from 0_th face frame (base picture).

fi_head_rotation_present_flag[i] is equal to 1 when present and fi_head_rotation_present_flag is equal to 0 when not present.

fi_rotation_roll[i], when i is not equal to 0, specifies the quantized residual parameter corresponding to head rotation around the front-to-back axis (called roll) between the i_th face frame and (i-1)_th face frame via fi_quantization_factor. When i is equal to 0, fi_rotation_roll[0] specifies the quantized front-to-back-axis head rotation parameter from 0_th face frame (base picture).

fi_rotation_pitch[i], when i is not equal to 0, specifies the quantized residual parameter corresponding to head rotation around the side-to-side axis (called pitch) between the i_th face frame and (i-1)_th face frame via fi_quantization_factor. When i is equal to 0, fi_rotation_pitch [0] specifies the quantized side-to-side-axis head rotation parameter from 0_th face frame (base picture).

fi_rotation_yaw[i], when i is not equal to 0, specifies the quantized residual parameter corresponding to head rotation around the vertical axis (called yaw) between the i_th face frame and (i-1)_th face frame via fi_quantization_factor. When i is equal to 0, fi_rotation_yaw[0] specifies the quantized vertical-axis head rotation parameter from 0_th face frame (base picture).

fi_head_translation_present_flag[i] is equal to 1 when present and fi_head_translation_present_flag is equal to 0 when not present.

fi_translation_x[i], when i is not equal to 0, specifies the quantized residual parameter corresponding to head translation around the x axis between the i_th face frame and (i-1)_th face frame via fi_quantization_factor. When i is equal to 0, fi_translation_x[0] specifies the quantized x-axis head translation parameter from 0_th face frame (base picture).

fi_translation_y[i], when i is not equal to 0, specifies the quantized residual parameter corresponding to head translation around the y axis between the i_th face frame and (i-1)_th face frame via fi_quantization_factor. When i is equal to 0, fi_translation_y[0] specifies the quantized y-axis head translation parameter from 0_th face frame (base picture).

fi_translation_z[i], when i is not equal to 0, specifies the quantized residual parameter corresponding to head translation around the z axis between the i_th face frame and (i-1)_th face frame via fi_quantization_factor. When i is equal to 0, fi_translation_z[0] specifies the quantized z-axis head translation parameter from 0_th face frame (base picture).

fi_eye_blinking_present_flag[i] is equal to 1 when present and fi_eye_blinking_present_flag is equal to 0 when not present.

fi_eye[i], when i is not equal to 0, specifies the quantized residual parameter corresponding to eye blinking degree between the i_th face frame and (i-1)_th face frame via fi_quantization_factor. When i is equal to 0, fi_eye[0] specifies the quantized eye blinking parameter from 0_th face frame (base picture).

fi_mouth_motion_present_flag[i] is equal to 1 when present and fi_mouth_motion_present_flag is equal to 0 when not present.

fi_mouth_para1[i], when i is not equal to 0, specifies the quantized residual parameter corresponding to mouth motion between the i_th face frame and (i-1)_th face frame via fi_quantization_factor. When i is equal to 0, fi_mouth_para1[0] specifies the quantized mouth motion parameter from 0_th face frame (base picture).

fi_mouth_para2[i], when i is not equal to 0, specifies the quantized residual parameter corresponding to mouth motion between the i_th face frame and (i-1)_th face frame via fi_quantization_factor. When i is equal to 0, fi_mouth_para2[0] specifies the quantized mouth motion parameter from 0_th face frame (base picture).

fi_mouth_para3[i], when i is not equal to 0, specifies the quantized residual parameter corresponding to mouth motion between the i_th face frame and (i-1)_th face frame via fi_quantization_factor. When i is equal to 0, fi_mouth_para3[0] specifies the quantized mouth motion parameter from 0_th face frame (base picture).

fi_mouth_para4[i], when i is not equal to 0, specifies the quantized residual parameter corresponding to mouth motion between the i_th face frame and (i-1)_th face frame via fi_quantization_factor. When i is equal to 0, fi_mouth_para4[0] specifies the quantized mouth motion parameter from 0_th face frame (base picture).

fi_mouth_para5[i], when i is not equal to 0, specifies the quantized residual parameter corresponding to mouth motion between the i_th face frame and (i-1)_th face frame via fi_quantization_factor. When i is equal to 0, fi_mouth_para5[0] specifies the quantized mouth motion parameter from 0_th face frame (base picture).

fi_mouth_para6[i], when i is not equal to 0, specifies the quantized residual parameter corresponding to mouth motion between the i_th face frame and (i-1)_th face frame via fi_quantization_factor. When i is equal to 0, fi_mouth_para6[0] specifies the quantized mouth motion parameter from 0_th face frame (base picture).

In some embodiments, the plurality of facial present flags indicating the presence and the length of certain syntax elements associated with the face video generative compression scheme and the parameter indicating a quantization factor to process facial semantic parameters are signaled for each face frame, respectively.

FIG. 13 is a flowchart of an exemplary method 1300 for processing video based on face video generative compression supplemental enhancement information (SEI) messages, according to some embodiments of the present disclosure. FIG. 14 shows another exemplary syntax of the disclosed face video generative compression SEI message, according to some embodiments of the present disclosure. Method 1300 describes a general syntax structure and syntax element order of the face video generative compression SEI message. Method 1300 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 1300. In some embodiments, method 1300 can be implemented by a computer program product, embodied in a computer-readable medium, including computer-executable instructions, such as program code, executed by computers (e.g., apparatus 400 of FIG. 4). Referring to FIG. 13 and FIG. 14, method 1300 may include the following steps 1302 to 1310.

At step 1302, an identifying number (e.g., fi_id) is signaled to indicate whether to use a face video generative compression scheme, referring to 1401 shown in FIG. 14.

At step 1304, a parameter indicating the number of face frames is signaled, e.g., fi_num_set_of_parameter, referring to 1402 shown in FIG. 14.

At step 1306, a parameter indicating a quantization factor to process facial semantic parameters is signaled for each face frame, respectively, referring to 1403 shown in FIG. 14. The facial sematic parameters may include 14 facial semantic parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3[i], fi_mouth_para4[i], fi_mouth_para5[i] and fi_mouth_para6[i]).

At step 1308, a plurality of facial present flags are further signaled to indicate the presence and the length of certain syntax elements associated with the face video generative compression scheme for each face frame, referring to 1404 shown in FIG. 14.

At step 1310, the corresponding facial information parameters are signaled for each face frame.

The difference between Table 2 in FIG. 12 and Table 3 in FIG. 14 is that in FIG. 14 different fi_quantization_factor for the facial information parameters are signaled for different face pictures. The process consistent with FIGS. 13 and 14 is described as follows.

First, the face video generative compression contains an identifying number that may be used to identify a face video generative compression filter.

Second, every SEI message always has a base picture (i.e., the first face frame in the face sequence) contained in the PU. The base picture can provide plentiful texture reference such that the facial information parameters carried in the SEI message can be used to reconstruct face frames.

Third, for these facial information parameters in the SEI message, it is proposed to set 5 corresponding facial information present flags (i.e., fi_head_location_present_flag[i], fi_head_rotation_present_flag[i], fi_head_translation_present_flag[i], fi_eye_blinking_present_flag[i] and fi_mouth_motion_present_flag[i]) to determine whether the related facial information parameters of every face picture [i] are transmitted or not.

Fourth, when fi_head_location_present_flag[i] is present, the head location parameter fi_location[i] shall be carried in the SEI message. When fi_head_rotation_present_flag[i] is present, these head rotation parameters (fi_rotation_roll [i], fi_rotation_pitch [i] and fi_rotation_yaw[i]) shall be carried in the SEI message. When fi_head translation_present_flag [i] is present, these head translation parameters (fi_translation_x [i], fi_translation_y[i] and fi_translation_z[i]) shall be carried in the SEI message. When fi_eye_blinking_flag[i] is present, the eye blinking parameter fi_eye[i] shall be carried in the SEI message. When fi_mouth_motion_present_flag[i] is present, these mouth motion parameters (fi_mouth_para1 [i], fi_mouth_para2[i], fi_mouth_para3[i], fi_mouth_para4 [i], fi_mouth_para5[i] and fi_mouth_para6[i]) shall be carried in the SEI message. When either of these 5 facial information present flags is not present, there are two situations according to the present disclosure.

In some embodiments, the facial information parameter for the current face frame (i.e., face frame[i]) is copied from the corresponding information from the previous face frame (i.e., face frame[i−1]). For the first face frame ([i=0]), the facial information parameter is copied from the base picture.

In some embodiments, the facial information parameter for the current face frame (i.e., face frame[i]) is copied from the base picture.

Fifth, when these corresponding facial information parameters are carried in this SEI message, the face video can be reconstructed towards personalized characterization or user-friendly manner via the strong generation ability of generative adversarial network.

The semantics associated with the syntax in FIG. 14 are given as follows.

fi_id contains an identifying number that may be used to identify a face video generative compression filter. The value of fi_id shall be in the range of 0 to $2^{32}$-2, inclusive.

fi_num_set_of_parameter indicates the number of face frames can use the face video generative compression filter to achieve the face video generative compression. The value of fi_num_set_of_parameter shall be in the range of 0 to $2^{10}$, inclusive. If exceeds, other face frames need be packaged into the next SEI message.

fi_quantization_factor[i] is quantization factor to process these 14 facial semantic parameters (i.e., fi_location[i], fi_rotation_roll [i], fi_rotation_pitch [i], fi_rotation_yaw[i], fi_translation_x [i], fi_translation_y[i], fi_translation_z[i], fi_eye[i], fi_mouth_para1[i], fi_mouth_para2[i], fi_mouth_para3[i], fi_mouth_para4[i], fi_mouth_para5[i] and fi_mouth_para6[i]) with the float16 type. These float16 parameters shall be further enlarged via the fi_quantization_factor, where the value of fi_quantization_factor[i] shall be in the range of 0 to $10^{16}$. For example, the value of original facial parameter is 0.1234567891234567 and the value of fi_quantization_factor is $10^6$, thus its corresponding quantized facial information parameter will be 123456.

fi_head_location_present_flag[i] is equal to 1 when present and fi_head_location_present_flag is equal to 0 when not present.

fi_location[i], when i is not equal to 0, specifies the quantized residual parameter corresponding to head location between the i_th face frame and (i-1)_th face frame via fi_quantization_factor. When i is equal to 0, fi_location[0] specifies the quantized head location parameter from 0_th face frame (base picture).

fi_head_rotation_present_flag[i] is equal to 1 when present and fi_head_rotation_present_flag is equal to 0 when not present.

fi_rotation_roll[i], when i is not equal to 0, specifies the quantized residual parameter corresponding to head rotation around the front-to-back axis (called roll) between the i_th face frame and (i-1)_th face frame via fi_quantization_factor. When i is equal to 0, fi_rotation_roll[0] specifies the quantized front-to-back-axis head rotation parameter from 0_th face frame (base picture).

fi_rotation_pitch[i], when i is not equal to 0, specifies the quantized residual parameter corresponding to head rotation around the side-to-side axis (called pitch) between the i_th face frame and (i-1)_th face frame via fi_quantization_factor. When i is equal to 0, fi_rotation_pitch [0] specifies the quantized side-to-side-axis head rotation parameter from 0_th face frame (base picture).

fi_rotation_yaw[i], when i is not equal to 0, specifies the quantized residual parameter corresponding to head rotation around the vertical axis (called yaw) between the i_th face frame and (i-1)_th face frame via fi_quantization_factor. When i is equal to 0, fi_rotation_yaw[0] specifies the quantized vertical-axis head rotation parameter from 0_th face frame (base picture).

fi_head_translation_present_flag[i] is equal to 1 when present and fi_head_translation_present_flag is equal to 0 when not present.

fi_translation_x[i], when i is not equal to 0, specifies the quantized residual parameter corresponding to head translation around the x axis between the i_th face frame and (i-1)_th face frame via fi_quantization_factor. When i is equal to 0, fi_translation_x[0] specifies the quantized x-axis head translation parameter from 0_th face frame (base picture).

fi_translation_y[i], when i is not equal to 0, specifies the quantized residual parameter corresponding to head translation around the y axis between the i_th face frame and (i-1)_th face frame via fi_quantization_factor. When i is equal to 0, fi_translation_y[0] specifies the quantized y-axis head translation parameter from 0_th face frame (base picture).

fi_translation_z[i], when i is not equal to 0, specifies the quantized residual parameter corresponding to head translation around the z axis between the i_th face frame and (i-1)_th face frame via fi_quantization_factor. When i is equal to 0, fi_translation_z[0] specifies the quantized z-axis head translation parameter from 0_th face frame (base picture).

fi_eye_blinking_present_flag[i] is equal to 1 when present and fi_eye_blinking_present_flag is equal to 0 when not present.

fi_eye[i], when i is not equal to 0, specifies the quantized residual parameter corresponding to eye blinking degree between the i_th face frame and (i-1)_th face frame via fi_quantization_factor. When i is equal to 0, fi_eye[0] specifies the quantized eye blinking parameter from 0_th face frame (base picture).

fi_mouth_motion_present_flag[i] is equal to 1 when present and fi_mouth_motion_present_flag is equal to 0 when not present.

fi_mouth_para1[i], when i is not equal to 0, specifies the quantized residual parameter corresponding to mouth motion between the i_th face frame and (i-1)_th face frame via fi_quantization_factor. When i is equal to 0, fi_mouth_para1[0] specifies the quantized mouth motion parameter from 0_th face frame (base picture).

fi_mouth_para2[i], when i is not equal to 0, specifies the quantized residual parameter corresponding to mouth motion between the i_th face frame and (i-1)_th face frame via fi_quantization_factor. When i is equal to 0, fi_mouth_para2[0] specifies the quantized mouth motion parameter from 0_th face frame (base picture).

fi_mouth_para3[i], when i is not equal to 0, specifies the quantized residual parameter corresponding to mouth motion between the i_th face frame and (i-1)_th face frame via fi_quantization_factor. When i is equal to 0, fi_mouth_para3[0] specifies the quantized mouth motion parameter from 0_th face frame (base picture).

fi_mouth_para4[i], when i is not equal to 0, specifies the quantized residual parameter corresponding to mouth motion between the i_th face frame and (i-1)_th face frame via fi_quantization_factor. When i is equal to 0, fi_mouth_para4[0] specifies the quantized mouth motion parameter from 0_th face frame (base picture).

fi_mouth_para5[i], when i is not equal to 0, specifies the quantized residual parameter corresponding to mouth motion between the i_th face frame and (i-1)_th face frame via fi_quantization_factor. When i is equal to 0, fi_mouth_para5[0] specifies the quantized mouth motion parameter from 0_th face frame (base picture).

fi_mouth_para6[i], when i is not equal to 0, specifies the quantized residual parameter corresponding to mouth motion between the i_th face frame and (i-1)_th face frame via fi_quantization_factor. When i is equal to 0, fi_mouth_para6[0] specifies the quantized mouth motion parameter from 0_th face frame (base picture).

FIG. 15 is a flowchart of an exemplary method 1500 for processing video based on face video generative compression supplemental enhancement information (SEI) messages, according to some embodiments of the present disclosure. Method 1500 describes a general syntax structure and syntax element order of the face video generative compression SEI message. Method 1500 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4). Referring to FIG. 15, method 1500 may include the following steps 1502 to 1506.

At step 1502, whether a face video generative compression scheme is used is determined based on an identifying number.

At step 1504, in response to a determination that the face video generative compression scheme is used, a supplemental enhancement information (SEI) message is decoded. The SEI message includes facial information, for example, the facial information as shown in FIG. 10, FIG. 12, or FIG. 14.

In some embodiments, decoding the SEI message further includes decoding a flag indicating whether a syntax element associated with facial information is present in the SEI message, and in response to the syntax element associated with facial information is present, decoding the facial information based on the syntax element associated with facial information.

In some embodiments, decoding the SEI message further includes decoding a syntax element indicating a number of face frames using the face video generative compression scheme, and decoding the flag indicating whether a syntax element associated with facial information is present in the SEI message for each face frame respectively.

In some embodiments, decoding the SEI message further includes decoding a syntax element indicating a number of face frames using the face video generative compression scheme, and decoding a plurality of facial present flags indicating the presence and the length of certain syntax elements associated with the face video generative compression scheme are decoded for each face frame, respectively.

In some embodiments, decoding the SEI message further includes decoding a factor indicating a quantization factor to process facial information for each face frame, respectively.

At step 1506, a face picture is reconstructed based on the facial information and a base picture associated with the SEI message.

In some embodiments, the facial information for the current face frame (i.e., face frame[i]) is copied from the corresponding information from a previous face frame (i.e., face frame[i−1]). For the first face frame ([i=0]), the facial information is copied from the base picture.

In some embodiments, the facial information for the current face frame (i.e., face frame[i]) is copied from the base picture.

The embodiments may further be described using the following clauses:

1. A method of decoding a bitstream to output one or more pictures for a video stream, the method comprising:
      receiving a bitstream; and
      decoding, using coded information of the bitstream, one or more pictures; wherein the decoding comprises:

determining, based on an identifying number, whether a face video generative compression scheme is used;
      in response to a determination that the face video generative compression scheme is used, decoding a supplemental enhancement information (SEI) message, the SEI message comprising facial information; and
      reconstructing a face picture based on the facial information and a base picture associated with the SEI message.

2. The method according to clause 1, wherein the SEI message further comprises a flag indicating whether a syntax element associated with facial information is present in the SEI message, and the method further comprises:
      in response to the syntax element associated with facial information is present, decoding the facial information based on the syntax element associated with facial information.

3. The method according to clause 2, wherein the SEI message further comprises a syntax element indicating a number of face frames using the face video generative compression scheme, and the method further comprises:
      decoding the flag indicating whether a syntax element associated with facial information is present in the SEI message for each face frame respectively.

4. The method according to clause 2, wherein the SEI message further comprises a syntax element indicating a number of face frames using the face video generative compression scheme, and the method further comprises:
      decoding the facial information based on the syntax element associated with facial information for each face frame, respectively.

5. The method according to clause 4, further comprising:
      in response to a flag indicating that a syntax element associated with facial information is not present for a current face frame, copying corresponding facial information from a previous face frame.

6. The method according to clause 5, wherein the SEI message further comprises a base picture as a reference, and the method further comprises:
      in response to a flag indicating that a syntax element associated with facial information is not present for a first face frame, copying corresponding facial information from the base picture.

7. The method according to clause 4, wherein the SEI message further comprises a base picture as a reference, and the method further comprises:
      in response to a flag indicating that a syntax element associated with facial information is not present for a current face frame, copying corresponding facial information from the base picture.

8. The method according to any one of clause 1 to 7, wherein the SEI message further comprises a factor indicating a quantization factor to process the facial information, and the method further comprises:
      decoding the factor; and
      processing the facial information based on the factor.

9. The method according to clause 8, wherein the SEI message further comprises a syntax element indicating a number of face frames using the face video generative compression scheme, and the method further comprises:

decoding the factor for each face frame respectively; and processing the facial information based on the factor for each face frame.

10. A method of encoding a video sequence into a bitstream, the method comprising:

receiving a video sequence;

encoding one or more pictures of the video sequence; and generating a bitstream;

wherein the encoding comprises:

signaling an identifying number indicating whether a face video generative compression scheme is used.

11. The method according to clause 10, wherein when the face video generative compression scheme is used, the method further comprises:

signaling a flag indicating whether a syntax element associated with facial information is present; and when the flag indicating the syntax element associated with facial information is present, signaling corresponding syntax element associated with facial information.

12. The method according to clause 11, further comprising:

signaling a syntax element indicating a number of face frames using the face video generative compression scheme;

and signaling the flag indicating whether a syntax element associated with facial information is present for each face frame respectively.

13. The method according to clause 11, further comprising:

signaling a syntax element indicating a number of face frames using the face video generative compression scheme; and signaling a factor indicating a quantization factor to process the facial information for each face frame respectively.

14. A non-transitory computer readable storage medium storing a bitstream of a video, the bitstream comprising:

a supplemental enhancement information (SEI) message, the SEI message comprising facial information, wherein the facial information is used for reconstructing a face picture based on a base picture associated with the face picture.

15. The non-transitory computer readable storage medium according to clause 14, wherein the SEI message further comprises a flag indicating whether a syntax element associated with facial information is present in the SEI message.

16. The non-transitory computer readable storage medium according to clause 15, wherein the SEI message further comprises a syntax element indicating a number of face frames using a face video generative compression scheme.

17. The non-transitory computer readable storage medium according to clause 16, wherein the SEI message further comprises one or more syntax elements associated with facial information for each face frame respectively.

18. The non-transitory computer readable storage medium according to clause 14, wherein the SEI message further comprises a syntax element indicating a number of face frames using a face video generative compression scheme and a flag indicating whether a syntax element associated with facial information is present in the SEI message for each face frame.

19. The non-transitory computer readable storage medium according to clause 14, wherein the SEI message further comprises a factor indicating a quantization factor to process the facial information.

20. The non-transitory computer readable storage medium according to clause 14, wherein the SEI message further comprises a syntax element indicating a number of face frames using a face video generative compression scheme and a factor indicating a quantization factor to process the facial information for each frame.

In some embodiments, a non-transitory computer-readable storage medium including instructions is also provided, and the instructions may be executed by a device (such as the disclosed encoder and decoder), for performing the above-described methods. In some embodiments, a non-transitory computer-readable storage medium storing a bitstream or SEI message is also provided. The bitstream can be encoded and decoded according to the above-described face video generative compression supplemental enhancement information (SEI) messages (e.g., FIG. 10, FIG. 12, and FIG. 14). Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, the method comprising:
   receiving a bitstream; and
   decoding, using coded information of the bitstream, one or more pictures;
   wherein the decoding comprises:
      determining, based on an identifying number, whether a face video generative compression scheme is used;
      in response to a determination that the face video generative compression scheme is used, decoding a supplemental enhancement information (SEI) message, the SEI message comprising facial information; and
      reconstructing a face picture based on the facial information and a base picture associated with the SEI message.

2. The method according to claim 1, wherein the SEI message further comprises a flag indicating whether a syntax element associated with facial information is present in the SEI message, and the method further comprises:
   in response to the syntax element associated with facial information is present, decoding the facial information based on the syntax element associated with facial information.

3. The method according to claim 2, wherein the SEI message further comprises a syntax element indicating a number of face frames using the face video generative compression scheme, and the method further comprises:
   decoding the flag indicating whether a syntax element associated with facial information is present in the SEI message for each face frame respectively.

4. The method according to claim 2, wherein the SEI message further comprises a syntax element indicating a number of face frames using the face video generative compression scheme, and the method further comprises:
   decoding the facial information based on the syntax element associated with facial information for each face frame, respectively.

5. The method according to claim 4, further comprising:
   in response to a flag indicating that a syntax element associated with facial information is not present for a current face frame, copying corresponding facial information from a previous face frame.

6. The method according to claim 5, wherein the SEI message further comprises a base picture as a reference, and the method further comprises:
   in response to a flag indicating that a syntax element associated with facial information is not present for a first face frame, copying corresponding facial information from the base picture.

7. The method according to claim 4, wherein the SEI message further comprises a base picture as a reference, and the method further comprises:
   in response to a flag indicating that a syntax element associated with facial information is not present for a current face frame, copying corresponding facial information from the base picture.

8. The method according to claim 1, wherein the SEI message further comprises a factor indicating a quantization factor to process the facial information, and the method further comprises:
   decoding the factor; and
   processing the facial information based on the factor.

9. The method according to claim 8, wherein the SEI message further comprises a syntax element indicating a number of face frames using the face video generative compression scheme, and the method further comprises:
   decoding the factor for each face frame respectively; and
   processing the facial information based on the factor for each face frame.

10. A method of encoding a video sequence into a bitstream, the method comprising:
   receiving a video sequence;
   encoding one or more pictures of the video sequence; and
   generating a bitstream;
   wherein the encoding comprises:
      encoding an identifying number indicating whether a face video generative compression scheme is used.

11. The method according to claim 10, wherein when the face video generative compression scheme is used, the method further comprises:
   encoding a flag indicating whether a syntax element associated with facial information is present; and
   when the flag indicating the syntax element associated with facial information is present, encoding corresponding syntax element associated with facial information.

12. The method according to claim 11, further comprising:
   encoding a syntax element indicating a number of face frames using the face video generative compression scheme; and
   encoding the flag indicating whether a syntax element associated with facial information is present for each face frame respectively.

13. The method according to claim 11, further comprising:
   encoding a syntax element indicating a number of face frames using the face video generative compression scheme; and
   encoding a factor indicating a quantization factor to process the facial information for each face frame respectively.

14. A method for signaling a bitstream, the method comprising:
   receiving a video sequence;
   encoding the video sequence by:
      encoding an identifying number indicating whether a face video generative compression scheme is used; and signaling a bitstream that is generated based on the encoding.

15. The method according to claim 14, wherein when the face video generative compression scheme is used, the encoding further comprises:

encoding a flag indicating whether a syntax element associated with facial information is present; and when the flag indicating the syntax element associated with facial information is present, encoding corresponding syntax element associated with facial information.

16. The method according to claim 15, wherein the encoding further comprises:

encoding a syntax element indicating a number of face frames using the face video generative compression scheme; and encoding the flag indicating whether a syntax element associated with facial information is present for each face frame respectively.

17. The method according to claim 15, wherein the encoding further comprises:

encoding a syntax element indicating a number of face frames using the face video generative compression scheme; and encoding a factor indicating a quantization factor to process the facial information for each face frame respectively.

* * * * *